US012659957B2

(12) United States Patent
Dimou et al.

(10) Patent No.: US 12,659,957 B2
(45) Date of Patent: Jun. 16, 2026

(54) UPLINK PACKET DELAY MEASUREMENT FOR NETWORK ENERGY SAVINGS

(71) Applicant: QUALCOMM Incorporated, San Diego, CA (US)

(72) Inventors: Konstantinos Dimou, New York, NY (US); Navid Abedini, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 335 days.

(21) Appl. No.: 18/357,324

(22) Filed: Jul. 24, 2023

(65) Prior Publication Data

US 2024/0064741 A1     Feb. 22, 2024

Related U.S. Application Data

(60) Provisional application No. 63/412,853, filed on Oct. 3, 2022, provisional application No. 63/400,013, filed on Aug. 22, 2022.

(51) Int. Cl.
| | |
|---|---|
| *H04W 72/20* | (2023.01) |
| *H04L 1/08* | (2006.01) |
| *H04W 72/1268* | (2023.01) |

(52) U.S. Cl.
CPC ............... *H04W 72/20* (2023.01); *H04L 1/08* (2013.01); *H04W 72/1268* (2013.01)

(58) Field of Classification Search
None
See application file for complete search history.

(56) References Cited

U.S. PATENT DOCUMENTS

| | | | |
|---|---|---|---|
| 2014/0135030 A1* | 5/2014 | Wang ................ | H04W 28/0917 |
| | | | 455/453 |
| 2024/0137804 A1* | 4/2024 | Kim ...................... | H04W 28/06 |
| 2024/0224095 A1* | 7/2024 | Yan ....................... | H04W 24/10 |

OTHER PUBLICATIONS

3GPP TR 37.816: "3rd Generation Partnership Project, Technical Specification Group Radio Access Network, Study on RAN-Centric Data Collection and Utilization for LTE and NR (Release 16)", 3GPP Standard Technical Report, 3rd Generation Partnership Project, Mobile Competence Centre, 650, Route Des Lucioles, F-06921, Sophia-Antipolis Cedex, France, No. V16.0.0, Jul. 23, 2019, pp. 1-35, XP051754713, paragraph 5.2.2, Chapters 5.6, 6.2.2.2.1, Figures 6.2.2.2.1-1, the whole document.

(Continued)

*Primary Examiner* — Yaotang Wang
(74) *Attorney, Agent, or Firm* — Holland & Hart LLP

(57) ABSTRACT

Methods, systems, and devices for wireless communications are described herein. To support network energy savings, a user equipment (UE) may receive, from a network entity, control signaling that indicates a configuration for measuring uplink packet delay for transmission of a packet. The UE may generate a measurement of the uplink packet delay for transmission of the packet. The measurement may correspond to a duration between a packet arrival time at a packet data convergence protocol layer of the UE and a transmission or a retransmission of the packet. The UE may transmit control signaling that indicates the generated measurement. The network entity may obtain the measurement and evaluate whether to switch a cell to an off state based on the obtained measurement.

30 Claims, 19 Drawing Sheets

(56) References Cited

OTHER PUBLICATIONS

3GPP TS 38.314: "3rd Generation Partnership Project, Technical Specification Group Radio Access Network, NR, Layer 2 Measurements, (Release 17)", 3GPP Standard, Technical, Specification Report, 3GPP TS 38.314, 3rd Generation Partnership Project (3GPP), Mobile Competence Centre 650, Route Des, Lucioles, F-06921 Sophia-Antipolis Cedex France, No. V17.1.0 Jul. 17, 2022, XP052183739, pp. 1-28, Chapters 4.2.1.2.2, 4.2.1.2.3, 4.3.1.1, 4.3.1.2, 4.3.1.3, Tables 4.3.1.1-1.

Huawei., et al., "Discussion on Delay Measurement and Collection", 3GPP TSG-RAN WG2 Meeting #107b, R2-1912755, Discussion on Delay Measurement and Collection, 3rd Generation Partnership Project (3GPP), Mobile Competence Centre, 650, Route Des Lucioles, F-06921 Sophia-antipolis Cedex, vol. RAN WG2, No. Chongqing, China, Oct. 14, 2019-Oct. 18, 2019, Oct. 2, 2019, XP051803681, 11 Pages, Chapter 2.2.2.

International Search Report and Written Opinion—PCT/US2023/070898—ISA/EPO—Nov. 7, 2023.

Rohde & Schwarz: "Correction to NR5GC MDT Testcase 8.1.6.1.1.2", 3GPP TSG-RAN5 Meeting #96-e, R5-2xxxxx, Online, 3GPP TS 38.523-1 V16.12.0 (Jun. 2022), 3GPP draft, R5S220961_R5-2200XXX_8_1_6_1_1_2, 3rd Generation Partnership Project (3GPP), Mobile Competence Centre, 650, Route Des Lucioles, F-06921 Sophia-antipolis Cedex, France, vol. RAN WG5, No. Online, Aug. 15, 2022-Aug. 26, 2022, Aug. 9, 2022, pp. 1112-1122, XP052269867, Chapters 8.1.6.1.1.2.2, 8.1.6.1.1.2.3.2, 8.1.6.1.1.2.3.3.

* cited by examiner

300

130    105    115

Network Entity

Transceiver    1310

Antenna    1315

Communications Manager    1320

Memory

Code    1330

1325

1340

Processor    1335

1305

1300

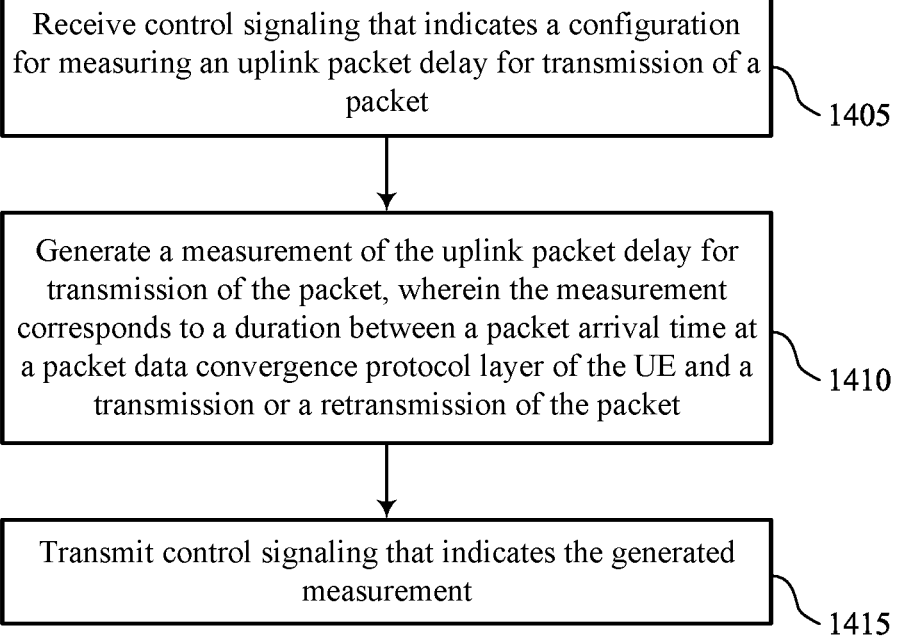

Receive control signaling that indicates a configuration for measuring an uplink packet delay for transmission of a packet

1405

Generate a measurement of the uplink packet delay for transmission of the packet, wherein the measurement corresponds to a duration between a packet arrival time at a packet data convergence protocol layer of the UE and a transmission or a retransmission of the packet

1410

Transmit control signaling that indicates the generated measurement

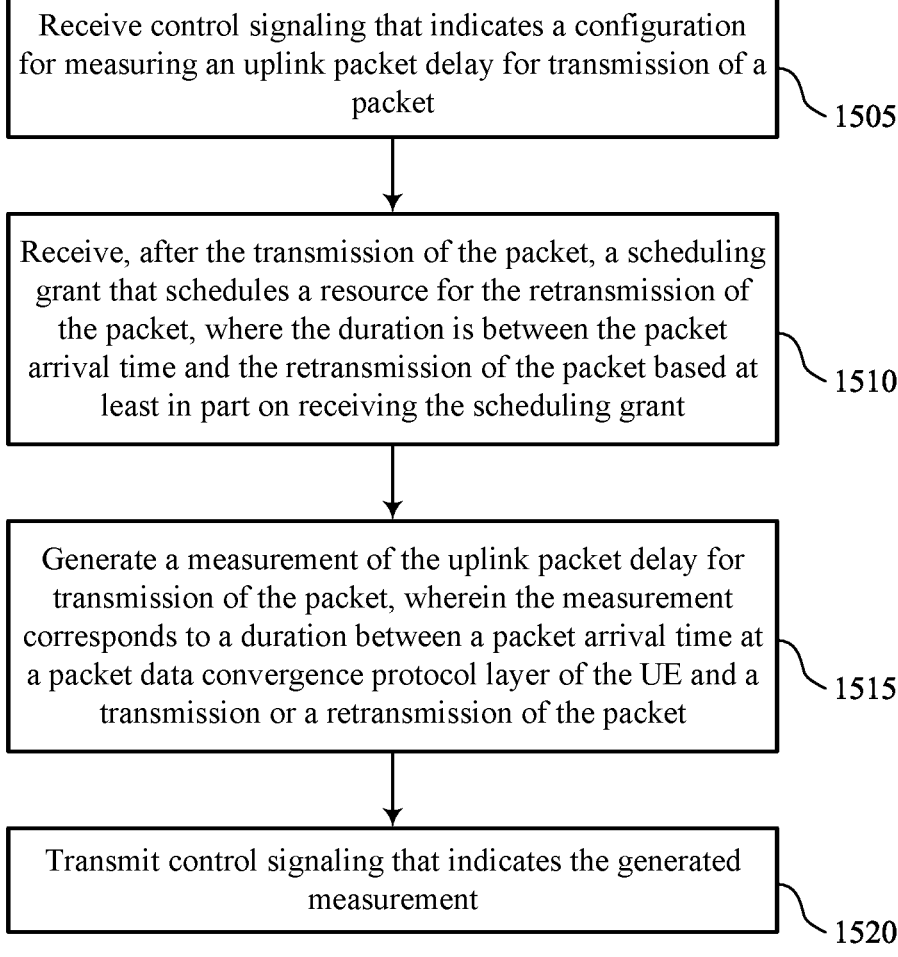

Receive control signaling that indicates a configuration for measuring an uplink packet delay for transmission of a packet

⌐ 1505

Receive, after the transmission of the packet, a scheduling grant that schedules a resource for the retransmission of the packet, where the duration is between the packet arrival time and the retransmission of the packet based at least in part on receiving the scheduling grant

⌐ 1510

Generate a measurement of the uplink packet delay for transmission of the packet, wherein the measurement corresponds to a duration between a packet arrival time at a packet data convergence protocol layer of the UE and a transmission or a retransmission of the packet

⌐ 1515

Transmit control signaling that indicates the generated measurement

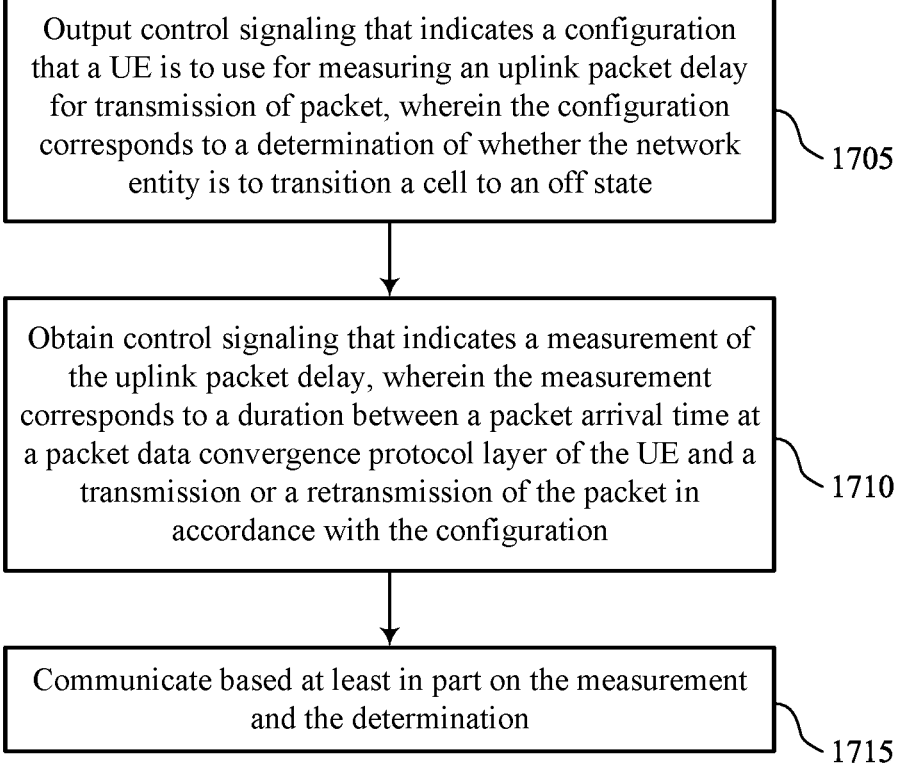

Output control signaling that indicates a configuration that a UE is to use for measuring an uplink packet delay for transmission of packet, wherein the configuration corresponds to a determination of whether the network entity is to transition a cell to an off state

1705

Obtain control signaling that indicates a measurement of the uplink packet delay, wherein the measurement corresponds to a duration between a packet arrival time at a packet data convergence protocol layer of the UE and a transmission or a retransmission of the packet in accordance with the configuration

1710

Communicate based at least in part on the measurement and the determination

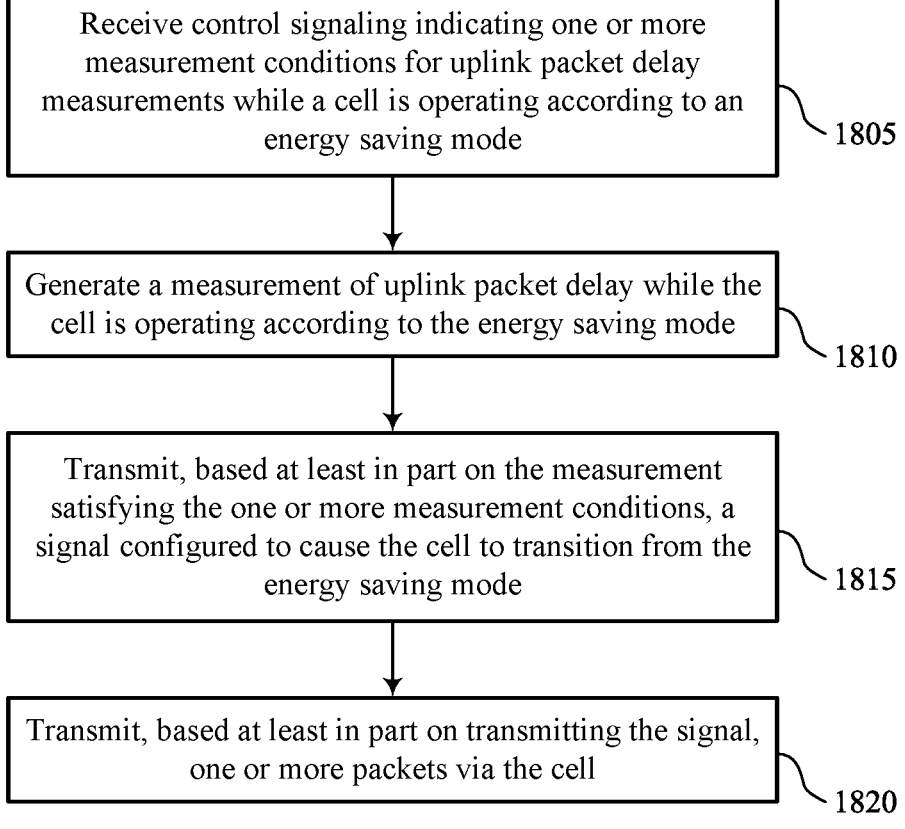

Receive control signaling indicating one or more measurement conditions for uplink packet delay measurements while a cell is operating according to an energy saving mode

1805

Generate a measurement of uplink packet delay while the cell is operating according to the energy saving mode

1810

Transmit, based at least in part on the measurement satisfying the one or more measurement conditions, a signal configured to cause the cell to transition from the energy saving mode

1815

Transmit, based at least in part on transmitting the signal, one or more packets via the cell

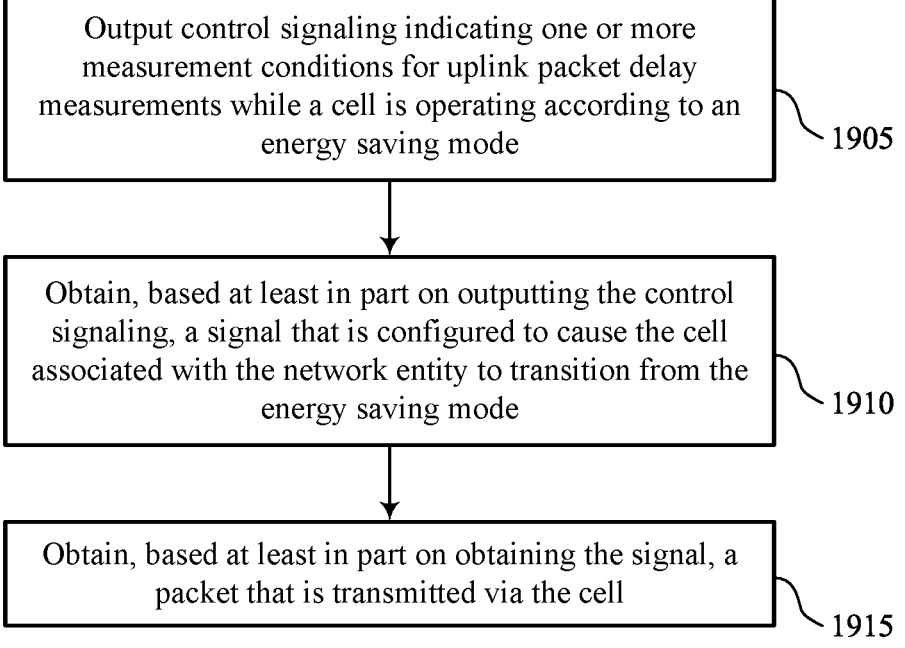

Output control signaling indicating one or more measurement conditions for uplink packet delay measurements while a cell is operating according to an energy saving mode ⟍ 1905

Obtain, based at least in part on outputting the control signaling, a signal that is configured to cause the cell associated with the network entity to transition from the energy saving mode ⟍ 1910

Obtain, based at least in part on obtaining the signal, a packet that is transmitted via the cell ⟍ 1915

UPLINK PACKET DELAY MEASUREMENT FOR NETWORK ENERGY SAVINGS

CROSS REFERENCE

The present application for patent claims the benefit of U.S. Provisional Patent Application No. 63/400,013 by DIMOU et al., entitled "UPLINK PACKET DELAY MEASUREMENT FOR NETWORK ENERGY SAVINGS," filed Aug. 22, 2022, and the benefit of U.S. Provisional Patent Application No. 63/412,853 by DIMOU et al., entitled "UPLINK PACKET DELAY MEASUREMENT FOR NETWORK ENERGY SAVINGS," filed Oct. 3, 2022, each of which is assigned to the assignee hereof, and each of which is expressly incorporated by reference herein.

FIELD OF TECHNOLOGY

The following relates to wireless communications, including uplink packet delay measurement for network energy savings.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

Wireless communications systems may support various techniques implemented by devices to reduce power consumption. For example, UEs may operate in low power modes in which the UEs may cease transmission or reception for a duration. Some techniques may support reduced power consumption at the network, such as by implementing power control techniques to identify adequate downlink transmission power for communications with UEs.

SUMMARY

The described techniques relate to improved methods, systems, devices, and apparatuses that support uplink packet delay measurement for network energy savings. For example, the described techniques provide for accurate uplink packet delay measurements that may be used by a network entity in decisions regarding switching one or more cells to an off state in support of reduced power consumption at the network. The network may configure a user equipment (UE) with an uplink packet delay configuration which the UE is to use for measuring and reporting the uplink packet delay. The UE may generate a measurement of the uplink packet delay for transmission of the packet, and the uplink packet delay may correspond to a duration between a packet arrival time at a packet data convergence protocol layer of the UE and a transmission or retransmission of the packet. The UE may transmit control singling that indicates the generated measurement. The network may use the received measurement to determine whether to switch a cell to an off state (e.g., to an energy saving mode) for a duration.

The described techniques may also provide for a UE measuring uplink packet delay while a cell is operating according to an energy saving mode, and the UE transmitting a signal to cause the cell to transition from the energy saving mode. For example, the UE may receive control signaling indicating one or more measurement conditions for uplink packet delay measurements while a cell is operating according to an energy saving mode. The UE may generate one or more measurements of uplink packet delay while the cell is operating according to the energy saving mode. The UE may transmit, based on the measurement satisfying one or more measurement conditions, a signal configured to cause the cell to transition from the energy saving mode, and transmit one or more packets to the cell in response to transmitting the signal.

A method for wireless communications at a UE is described. The method may include receiving control signaling that indicates a configuration for measuring an uplink packet delay for transmission of a packet, generating a measurement of the uplink packet delay for transmission of the packet, where the measurement corresponds to a duration between a packet arrival time at a packet data convergence protocol layer of the UE and a transmission or a retransmission of the packet, and transmitting control signaling that indicates the generated measurement.

An apparatus for wireless communications at a UE is described. The apparatus may include at least one processor and at least one memory coupled with the at least one processor, with instructions stored in the at least one memory, the instructions being executable by the at least one processor, individually or in any combination, to cause the apparatus to receive control signaling that indicates a configuration for measuring an uplink packet delay for transmission of a packet, generate a measurement of the uplink packet delay for transmission of the packet, where the measurement corresponds to a duration between a packet arrival time at a packet data convergence protocol layer of the UE and a transmission or a retransmission of the packet, and transmit control signaling that indicates the generated measurement.

Another apparatus for wireless communications at a UE is described. The apparatus may include means for receiving control signaling that indicates a configuration for measuring an uplink packet delay for transmission of a packet, means for generating a measurement of the uplink packet delay for transmission of the packet, where the measurement corresponds to a duration between a packet arrival time at a packet data convergence protocol layer of the UE and a transmission or a retransmission of the packet, and means for transmitting control signaling that indicates the generated measurement.

A non-transitory computer-readable medium storing code for wireless communications at a UE is described. The code may include instructions executable by at least one processor to receive control signaling that indicates a configuration for measuring an uplink packet delay for transmission of a packet, generate a measurement of the uplink packet delay for transmission of the packet, where the measurement corresponds to a duration between a packet arrival time at a packet data convergence protocol layer of the UE and a transmission or a retransmission of the packet, and transmit control signaling that indicates the generated measurement.

Some examples of the method, apparatuses, and non-transitory computer-readable medium described herein may further include operations, features, means, or instructions for receiving, after the transmission of the packet, a scheduling grant that schedules a resource for the retransmission of the packet, where the duration may be between the packet arrival time and the retransmission of the packet based on receiving the scheduling grant.

Some examples of the method, apparatuses, and non-transitory computer-readable medium described herein may further include operations, features, means, or instructions for monitoring, after transmission of the packet and during a set of resources, for a scheduling grant that schedules a resource for the retransmission of the packet and determining, based on the monitoring, an absence of the scheduling grant during the set of resources, where the duration may be between the packet arrival time and the transmission of the packet based on determining the absence of the scheduling grant.

In some examples of the method, apparatuses, and non-transitory computer-readable medium described herein, generating the measurement may include operations, features, means, or instructions for generating an average of the duration between the packet arrival time and the transmission or the retransmission for each packet for a set of multiple packets, where the generated measurement may be the average of the duration.

In some examples of the method, apparatuses, and non-transitory computer-readable medium described herein, receiving the control signaling may include operations, features, means, or instructions for receiving control information that indicates a quantity of packets of the set of multiple packets, where the average may be generated based on receiving the control information.

In some examples of the method, apparatuses, and non-transitory computer-readable medium described herein, receiving the control signaling may include operations, features, means, or instructions for receiving control information that indicates a duration during which the UE may be to monitor the uplink packet delay for a set of multiple packets, where the measurement may be generated based on measuring the uplink packet delay for the set of multiple packets during the duration.

In some examples of the method, apparatuses, and non-transitory computer-readable medium described herein, receiving the control signaling may include operations, features, means, or instructions for receiving the control signaling indicating a measurement threshold to be applied to each data radio bearer of a set of data radio bearers.

In some examples of the method, apparatuses, and non-transitory computer-readable medium described herein, transmitting the control signaling may include operations, features, means, or instructions for transmitting information that indicates whether the measurement exceeds an uplink packet delay threshold.

In some examples of the method, apparatuses, and non-transitory computer-readable medium described herein, transmitting the information that indicates whether the measurement exceeds the uplink packet delay threshold may include operations, features, means, or instructions for transmitting an indication of whether the measurement exceeds the uplink packet delay threshold on a resource of a physical uplink control channel.

In some examples of the method, apparatuses, and non-transitory computer-readable medium described herein, the indication may be a bit carried on the resource of the physical uplink control channel or the indication may be a cyclic shift of the resource of the physical uplink control channel.

Some examples of the method, apparatuses, and non-transitory computer-readable medium described herein may further include operations, features, means, or instructions for determining that the measurement exceeds the uplink packet delay threshold, where the information may be transmitted in response to determining that the measurement exceeds the uplink packet delay threshold.

In some examples of the method, apparatuses, and non-transitory computer-readable medium described herein, transmitting the information that indicates whether the measurement exceeds the uplink packet delay threshold may include operations, features, means, or instructions for transmitting an indication that a ratio of uplink packets may have measurements that exceed the uplink packet delay threshold.

In some examples of the method, apparatuses, and non-transitory computer-readable medium described herein, transmitting the information that indicates that the measurement exceeds the uplink packet delay threshold may include operations, features, means, or instructions for transmitting an indication that the measurement exceeds the uplink packet delay threshold on a control resource of a physical uplink shared channel.

In some examples of the method, apparatuses, and non-transitory computer-readable medium described herein, receiving the control signaling may include operations, features, means, or instructions for receiving control information that indicates a resource that the UE may be to use for transmitting the information that indicates whether the measurement exceeds the uplink packet delay threshold.

In some examples of the method, apparatuses, and non-transitory computer-readable medium described herein, the control information may be received via a radio resource control message.

In some examples of the method, apparatuses, and non-transitory computer-readable medium described herein, transmitting the control signaling may include operations, features, means, or instructions for transmitting the measurement of the uplink packet delay for each packet of a set of multiple packets.

In some examples of the method, apparatuses, and non-transitory computer-readable medium described herein, generating the measurement may include operations, features, means, or instructions for generating the measurement that corresponds to the duration between the packet arrival time and the retransmission that may be subsequent to a first retransmission of the packet.

In some examples of the method, apparatuses, and non-transitory computer-readable medium described herein, transmitting the control signaling may include operations, features, means, or instructions for transmitting a medium access control layer control element message that indicates the measurement.

Some examples of the method, apparatuses, and non-transitory computer-readable medium described herein may further include operations, features, means, or instructions for receiving, based on transmitting the control signaling, an indication that a cell in which the UE may be operating may be to switch to an off state during a transmission time interval.

A method for wireless communication at a network entity is described. The method may include outputting control signaling that indicates a configuration that a UE is to use for measuring an uplink packet delay for transmission of packet, where the configuration corresponds to a determination of whether the network entity is to transition a cell to an off state, obtaining control signaling that indicates a measurement of the uplink packet delay, where the measurement corresponds to a duration between a packet arrival time at a packet data convergence protocol layer of the UE and a transmission or a retransmission of the packet in accordance with the configuration, and communicating based on the measurement and the determination.

An apparatus for wireless communication at a network entity is described. The apparatus may include at least one processor and at least one memory coupled with the at least one processor, with instructions stored in the at least one memory, the instructions being executable by the at least one processor, individually or in any combination, to cause the apparatus to output control signaling that indicates a configuration that a UE is to use for measuring an uplink packet delay for transmission of packet, where the configuration corresponds to a determination of whether the network entity is to transition a cell to an off state, obtain control signaling that indicates a measurement of the uplink packet delay, where the measurement corresponds to a duration between a packet arrival time at a packet data convergence protocol layer of the UE and a transmission or a retransmission of the packet in accordance with the configuration, and communicate based at least in part on the measurement and the determination.

Another apparatus for wireless communication at a network entity is described. The apparatus may include means for outputting control signaling that indicates a configuration that a UE is to use for measuring an uplink packet delay for transmission of packet, where the configuration corresponds to a determination of whether the network entity is to transition a cell to an off state, means for obtaining control signaling that indicates a measurement of the uplink packet delay, where the measurement corresponds to a duration between a packet arrival time at a packet data convergence protocol layer of the UE and a transmission or a retransmission of the packet in accordance with the configuration, and means for communicating based on the measurement and the determination.

A non-transitory computer-readable medium storing code for wireless communication at a network entity is described. The code may include instructions executable by a processor to output control signaling that indicates a configuration that a UE is to use for measuring an uplink packet delay for transmission of packet, where the configuration corresponds to a determination of whether the network entity is to transition a cell to an off state, obtain control signaling that indicates a measurement of the uplink packet delay, where the measurement corresponds to a duration between a packet arrival time at a packet data convergence protocol layer of the UE and a transmission or a retransmission of the packet in accordance with the configuration, and communicate based at least in part on the measurement and the determination.

Some examples of the method, apparatuses, and non-transitory computer-readable medium described herein may further include operations, features, means, or instructions for outputting a scheduling grant that schedules a resource for retransmission of the packet, where the duration may be between the packet arrival time and the retransmission of the packet based on receiving the scheduling grant.

Some examples of the method, apparatuses, and non-transitory computer-readable medium described herein may further include operations, features, means, or instructions for obtaining the transmission of the packet, where the duration may be between the packet arrival time and the transmission of the packet based on obtaining the transmission of the packet.

In some examples of the method, apparatuses, and non-transitory computer-readable medium described herein, obtaining the control signaling may include operations, features, means, or instructions for obtaining an average of the duration for each packet of a set of multiple packets, where the measurement may be the average of the duration.

In some examples of the method, apparatuses, and non-transitory computer-readable medium described herein, outputting the control signaling may include operations, features, means, or instructions for outputting control information that indicates a quantity of packets of the set of multiple packets, where the control signaling that indicates the measurement may be obtained based on outputting the control signaling.

In some examples of the method, apparatuses, and non-transitory computer-readable medium described herein, outputting the control signaling may include operations, features, means, or instructions for outputting control information that indicates a duration during which the UE may be to monitor the uplink packet delay for a set of multiple packets, where the control signaling that indicates the measurement may be obtained based on outputting the control signaling.

In some examples of the method, apparatuses, and non-transitory computer-readable medium described herein, outputting the control signaling may include operations, features, means, or instructions for outputting the control signaling indicating a measurement threshold to be applied to each data radio bearer of a set of data radio bearers.

In some examples of the method, apparatuses, and non-transitory computer-readable medium described herein, obtaining the control signaling may include operations, features, means, or instructions for obtaining information that indicates whether the measurement exceeds an uplink packet delay threshold.

In some examples of the method, apparatuses, and non-transitory computer-readable medium described herein, obtaining the information may include operations, features, means, or instructions for obtaining an indication that indicates whether the measurement exceeds the uplink packet delay threshold on a resource of a physical uplink control channel.

In some examples of the method, apparatuses, and non-transitory computer-readable medium described herein, the indication may be a bit carried on the resource of the physical uplink control channel or the indication may be a cyclic shift of the resource of the physical uplink control channel.

In some examples of the method, apparatuses, and non-transitory computer-readable medium described herein, the information indicates that the measurement exceeds the uplink packet delay threshold.

In some examples of the method, apparatuses, and non-transitory computer-readable medium described herein, obtaining the information may include operations, features, means, or instructions for obtaining an indication of whether the measurement exceeds the uplink packet delay threshold on a control resource of a physical uplink shared channel.

In some examples of the method, apparatuses, and non-transitory computer-readable medium described herein, obtaining the information may include operations, features, means, or instructions for obtaining an indication that a ratio of uplink packets may have measurements that exceed the uplink packet delay threshold.

In some examples of the method, apparatuses, and non-transitory computer-readable medium described herein, outputting the control signaling may include operations, features, means, or instructions for outputting control information that indicates a resource that the UE may be to use for transmitting the information that indicates whether the measurement exceeds the uplink packet delay threshold.

In some examples of the method, apparatuses, and non-transitory computer-readable medium described herein, the control information may be output using a radio resource control message.

In some examples of the method, apparatuses, and non-transitory computer-readable medium described herein, obtaining the control signaling that indicates the measurement may include operations, features, means, or instructions for obtaining the measurement of the uplink packet delay for each packet of a set of multiple packets.

In some examples of the method, apparatuses, and non-transitory computer-readable medium described herein, obtaining the control signaling that indicates the measurement may include operations, features, means, or instructions for obtaining the measurement that corresponds to the duration between the packet arrival time and the retransmission that may be subsequent to a first retransmission of the packet.

In some examples of the method, apparatuses, and non-transitory computer-readable medium described herein, obtaining the control signaling may include operations, features, means, or instructions for obtaining a medium access control layer control element message that indicates the measurement.

Some examples of the method, apparatuses, and non-transitory computer-readable medium described herein may further include operations, features, means, or instructions for outputting, based at least in part on obtaining the control signaling, an indication that a cell in which the UE may be operating may switch to an off state during a transmission time interval.

A method for wireless communications at a UE is described. The method may include receiving control signaling indicating one or more measurement conditions for uplink packet delay measurements while a cell is operating according to an energy saving mode, generating a measurement of uplink packet delay while the cell is operating according to the energy saving mode, transmitting, based on the measurement satisfying the one or more measurement conditions, a signal configured to cause the cell to transition from the energy saving mode, and transmitting, based on transmitting the signal, one or more packets via the cell.

An apparatus for wireless communications at a UE is described. The apparatus may include a processor, memory coupled with the processor, and instructions stored in the memory. The instructions may be executable by the processor to cause the apparatus to receive control signaling indicating one or more measurement conditions for uplink packet delay measurements while a cell is operating according to an energy saving mode, generate a measurement of uplink packet delay while the cell is operating according to the energy saving mode, transmit, based on the measurement satisfying the one or more measurement conditions, a signal configured to cause the cell to transition from the energy saving mode, and transmit, based on transmitting the signal, one or more packets via the cell.

Another apparatus for wireless communications at a UE is described. The apparatus may include means for receiving control signaling indicating one or more measurement conditions for uplink packet delay measurements while a cell is operating according to an energy saving mode, means for generating a measurement of uplink packet delay while the cell is operating according to the energy saving mode, means for transmitting, based on the measurement satisfying the one or more measurement conditions, a signal configured to cause the cell to transition from the energy saving mode, and means for transmitting, based on transmitting the signal, one or more packets via the cell.

A non-transitory computer-readable medium storing code for wireless communications at a UE is described. The code may include instructions executable by a processor to receive control signaling indicating one or more measurement conditions for uplink packet delay measurements while a cell is operating according to an energy saving mode, generate a measurement of uplink packet delay while the cell is operating according to the energy saving mode, transmit, based on the measurement satisfying the one or more measurement conditions, a signal configured to cause the cell to transition from the energy saving mode, and transmit, based on transmitting the signal, one or more packets via the cell.

In some examples of the method, apparatuses, and non-transitory computer-readable medium described herein, receiving the control signaling may include operations, features, means, or instructions for receiving the control signaling indicating at least one averaging window for measuring an average uplink packet delay while the cell may be operating according to the energy saving mode.

In some examples of the method, apparatuses, and non-transitory computer-readable medium described herein, the control signaling indicates a duration and a start time for the at least one averaging window.

In some examples of the method, apparatuses, and non-transitory computer-readable medium described herein, the control signaling indicates a respective averaging window per data radio bearer of a set of data radio bearers.

In some examples of the method, apparatuses, and non-transitory computer-readable medium described herein, the control signaling indicates a start time for the at least one averaging window that may be based on a time when the cell transitions to operating according to the energy saving mode.

In some examples of the method, apparatuses, and non-transitory computer-readable medium described herein, the one or more measurement conditions include an average delay threshold and the measurement satisfies the one or more measurement conditions based on an average packet delay satisfying the average delay threshold during the at least one averaging window.

In some examples of the method, apparatuses, and non-transitory computer-readable medium described herein, receiving the control signaling may include operations, features, means, or instructions for receiving the control signaling indicating a respective measurement threshold per data radio bearer of a set of data radio bearers.

In some examples of the method, apparatuses, and non-transitory computer-readable medium described herein, receiving the control signaling may include operations, features, means, or instructions for receiving the control signaling indicating a measurement threshold to be applied to each data radio bearer of a set of data radio bearers.

In some examples of the method, apparatuses, and non-transitory computer-readable medium described herein, transmitting the signal may include operations, features, means, or instructions for transmitting an uplink wake up signal or a scheduling request that may be configured to cause the cell to transition from the energy saving mode.

In some examples of the method, apparatuses, and non-transitory computer-readable medium described herein, transmitting the signal may include operations, features, means, or instructions for transmitting the signal via a resource of a set of periodic resources configured for communications while the cell may be operating in the energy saving mode.

In some examples of the method, apparatuses, and non-transitory computer-readable medium described herein, transmitting the signal may include operations, features, means, or instructions for transmitting, to a low-power radio associated with the cell, the signal configured to cause the cell to transition from the energy saving mode.

In some examples of the method, apparatuses, and non-transitory computer-readable medium described herein, generating the measurement may include operations, features, means, or instructions for generating the measurement based on a packet arrival time at a packet data convergence protocol layer of the UE.

Some examples of the method, apparatuses, and non-transitory computer-readable medium described herein may further include operations, features, means, or instructions for determining that the one or more measurement conditions may be satisfied based on a ratio of packets in an uplink buffer of the UE exceeding a configured delay threshold.

Some examples of the method, apparatuses, and non-transitory computer-readable medium described herein may further include operations, features, means, or instructions for receiving signaling indicating the cell may be to transition to the energy saving mode, where the measurement may be generated based on receiving the signaling.

A method for wireless communications at a network entity is described. The method may include outputting control signaling indicating one or more measurement conditions for uplink packet delay measurements while a cell is operating according to an energy saving mode, obtaining, based on outputting the control signaling, a signal that is configured to cause the cell associated with the network entity to transition from the energy saving mode, and obtaining, based on obtaining the signal; a packet that is transmitted via the cell.

An apparatus for wireless communications at a network entity is described. The apparatus may include a processor, memory coupled with the processor, and instructions stored in the memory. The instructions may be executable by the processor to cause the apparatus to outputting control signal indicating one or more measurement conditions for uplink packet delay measurements while a cell is operating according to an energy saving mode, obtaining, base at least in part on outputting the control signaling, a signal that is configured to cause the cell associated with the network entity to transition from the energy saving mode, and obtaining, base at least in part on obtaining the signal; a packet that is transmitted via the cell.

Another apparatus for wireless communications at a network entity is described. The apparatus may include means for outputting control signaling indicating one or more measurement conditions for uplink packet delay measurements while a cell is operating according to an energy saving mode, means for obtaining, based on outputting the control signaling, a signal that is configured to cause the cell associated with the network entity to transition from the energy saving mode, and means for obtaining, based on obtaining the signal; a packet that is transmitted via the cell.

A non-transitory computer-readable medium storing code for wireless communications at a network entity is described. The code may include instructions executable by a processor to outputting control signal indicating one or more measurement conditions for uplink packet delay measurements while a cell is operating according to an energy saving mode, obtaining, base at least in part on outputting the control signaling, a signal that is configured to cause the cell associated with the network entity to transition from the energy saving mode, and obtaining, base at least in part on obtaining the signal; a packet that is transmitted via the cell.

In some examples of the method, apparatuses, and non-transitory computer-readable medium described herein, outputting the control signaling may include operations, features, means, or instructions for outputting the control signaling indicating at least one averaging window for measuring an average uplink packet delay while the cell may be operating according to the energy saving mode.

In some examples of the method, apparatuses, and non-transitory computer-readable medium described herein, the control signaling indicates a duration and a start time for the at least one averaging window.

In some examples of the method, apparatuses, and non-transitory computer-readable medium described herein, the control signaling indicates a respective averaging window per data radio bearer of a set of data radio bearers.

In some examples of the method, apparatuses, and non-transitory computer-readable medium described herein, the control signaling indicates a start time for the at least one averaging window that may be based on a time when the cell transitions to operating according to the energy saving mode.

In some examples of the method, apparatuses, and non-transitory computer-readable medium described herein, the one or more measurement conditions include an average delay threshold.

In some examples of the method, apparatuses, and non-transitory computer-readable medium described herein, outputting the control signaling may include operations, features, means, or instructions for outputting the control signaling indicating a respective measurement threshold per data radio bearer of a set of data radio bearers.

In some examples of the method, apparatuses, and non-transitory computer-readable medium described herein, outputting the control signaling may include operations, features, means, or instructions for outputting the control signaling indicating a measurement threshold to be applied to each data radio bearer of a set of data radio bearers.

In some examples of the method, apparatuses, and non-transitory computer-readable medium described herein, obtaining the signal may include operations, features, means, or instructions for obtaining an uplink wake up signal or a scheduling request to cause the cell to transition from the energy saving mode.

In some examples of the method, apparatuses, and non-transitory computer-readable medium described herein, obtaining the signal may include operations, features, means, or instructions for obtaining the signal via a resource of a set of periodic resources configured for communications while the cell may be operating in the energy saving mode.

In some examples of the method, apparatuses, and non-transitory computer-readable medium described herein, obtaining the signal may include operations, features, means, or instructions for obtaining the signal from a low-power radio associated with the cell.

BRIEF DESCRIPTION OF THE DRAWINGS

FIGS. 14 through 19 illustrate flowcharts showing methods that support uplink packet delay measurement for network energy savings in accordance with one or more aspects of the present disclosure.

DETAILED DESCRIPTION

Figure 1:
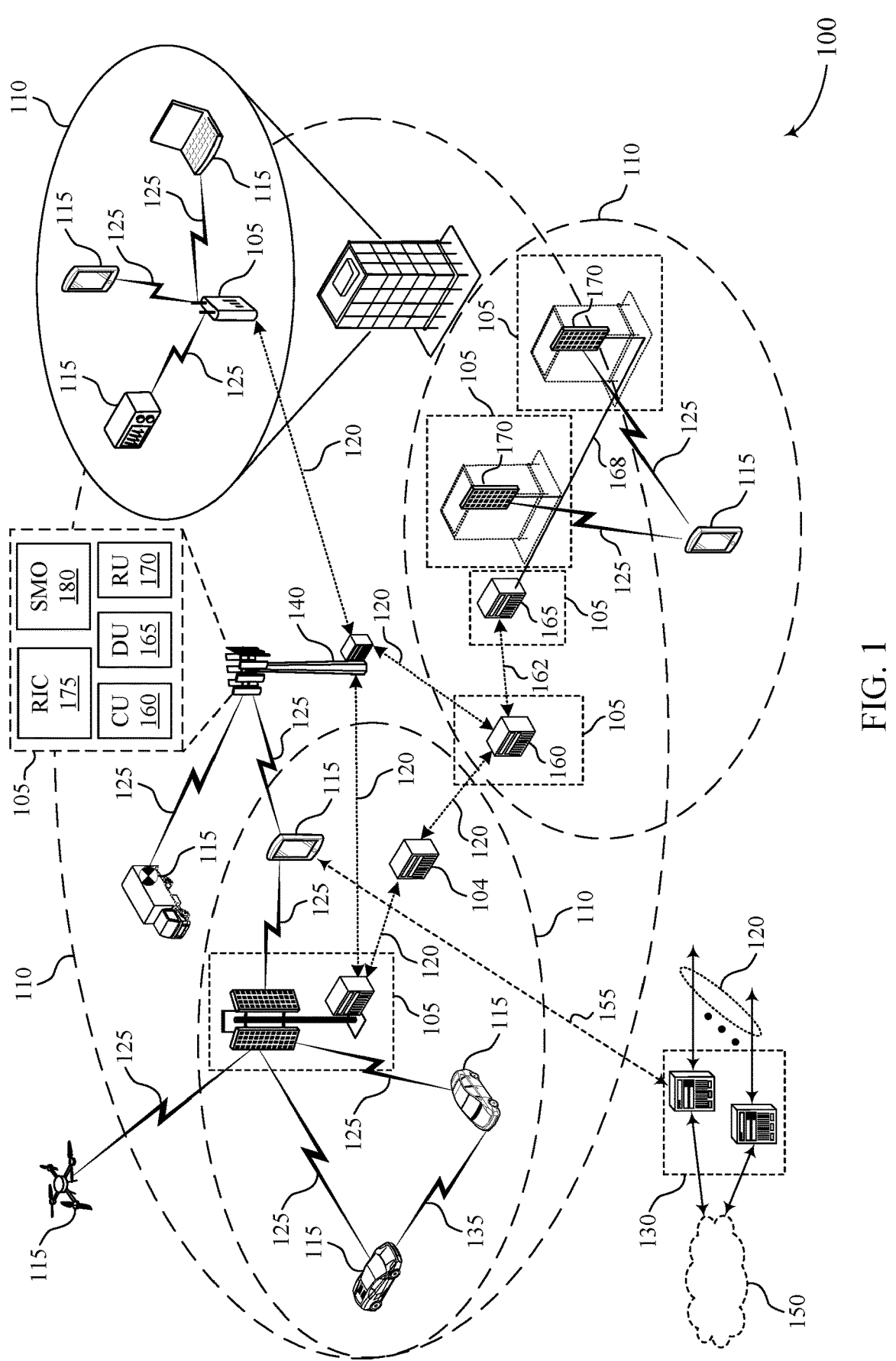
FIG. 1 illustrates an example of a wireless communications system that supports uplink packet delay measurement for network energy savings in accordance with one or more aspects of the present disclosure.

Wireless communications systems may support various techniques implemented by devices to reduce power and energy consumption. For example, user equipments (UEs) may operate in low power modes in which the UEs may cease transmission or reception for a duration. Some techniques may support reduced power consumption at the network, such as by implementing power control techniques to identify adequate downlink transmission power for communications with UEs.

Networks may also switch one or more cells to an off state to support network energy savings (e.g., the network entity may enter an energy saving mode). In consideration of whether to switch a cell to an off state or an energy saving mode, a network entity may evaluate a cell load and delay requirements for both uplink (UL) and downlink (DL) communications. Delay requirements in UL and DL may be determined by the network entity per data radio bearer based on radio resource control connection establishment with a UE. For DL, the network may measure the DL packet delay on a per packet basis on various layers and evaluate the measurements relative to the DL packet delay budgets. For UL, the network entity may receive measurements that are determined by the UEs. Some UL packet delay measurements may not be useful in evaluating whether to switch a cell to an off state or enter the energy saving mode, as the measurements may not be based on packet retransmissions and may be based on an average packet delay over a long duration. More particularly, packet retransmissions may impact the conditions in a cell and may not be considered in some UL packet delay measurements. Additionally, an UL packet delay averaged over a long period (e.g., 120 ms) may not be useful in determining whether to switch a cell to an off state (enter the energy saving mode) for a shorter duration (e.g., 5 ms).

Techniques described herein support a configuration for an UL packet delay measurement that supports a network entity in determining whether to switch a cell to an energy saving mode. The UL packet delay measurement may consider a duration between the packet arrival time and the packet transmission or retransmission time (rather than the duration between arrival and packet scheduling for transmission). Additionally, the measurements may be reported on a per packet basis, reported as an average over a small quantity of packets (e.g., four), reported as a measurement of a quantity of packets over a short duration (e.g., 5 ms), reported based on the measurement exceeding a packet delay threshold, or reported based on a ratio of packets exceeding the packet delay threshold. The proposed UL packet delay measurement techniques may be used when the network is considering switching a cell to an energy saving mode because other information (e.g., cell load, DL packet delay) indicates that switching the cell off may not impact communications.

Techniques described herein also support a configuration for an UL packet delay measurement by a UE when a cell associated with the UE is operating in accordance with the energy saving mode. For example, a UE may receive control signaling indicating one or more measurement conditions for uplink packet delay measurements while a cell is operating in accordance with the energy saving mode. The UE may measure uplink packet delays, and if a measurement satisfies one of the conditions, the UE may transmit a signal (e.g., an uplink wake-up signal (WUS) or scheduling request (SR)) that may cause the cell to transition from the energy saving mode (e.g., to an active state). In response to transmitting this signal, the UE may communicate an uplink packet via the cell. These and other techniques are described herein in further detail with respect to the figures.

Aspects of the disclosure are initially described herein in the context of wireless communications systems. Aspects of the disclosure are further described herein with respect to a wireless communications system illustrating network entity communications with various UEs, a measurement timeline for UL packet delay measurements, and a process flow diagram. Aspects of the disclosure are further illustrated by and described herein with reference to apparatus diagrams, system diagrams, and flowcharts that relate to uplink packet delay measurement for network energy savings.

FIG. 1 illustrates an example of a wireless communications system 100 that supports uplink packet delay measurement for network energy savings in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support uplink packet delay measurement for network energy savings as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max}\cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs

115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described herein with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

The wireless communications system 100 may support techniques to reduce power (e.g., energy) consumptions. More particularly, the network entities 105 and the UEs 115 may implement techniques to save power and reduce power consumption during and between communications. For example, the network entities 105 and the UEs 115 may implement power control techniques to identify transmission powers that support efficient communication while limiting transmission power. In some cases, a network entity 105 may switch a cell to an off state for a duration to support network energy savings. To determine whether to switch a cell to an off state, the network entity 105 may evaluate various conditions, such as cell load and DL and UL packet delay measurements relative to DL and UL packet delay requirements.

Techniques described herein support a UE 115 measuring the UL packet delay to support a network entity 105 in evaluating whether to switch a cell to an off state to further support network energy savings. As described herein, the UE 115 may generate a measurement of the UL packet delay that is based on a duration between the packet arrival time (e.g., at the PDCP layer of the UE 115) and the packet transmission or retransmission time (rather than the duration between arrival and packet scheduling for transmission). Additionally, the measurements may be reported on a per packet basis, reported as an average over a small quantity of packets (e.g., four), reported as a measurement of a quantity of packets over a short duration (e.g., 5 ms), or reported based on the measurement exceeding a packet delay threshold. These measurements and reporting techniques may support the network entity 105 in evaluating whether to switch the cell to the off state (e.g., enter an energy savings mode), which may support network energy savings.

Techniques are also described herein to support a UE 115 measuring an uplink packet delay while a cell associated with the UE is operating in accordance with the energy saving mode. For example, the UE 115 may be configured with (e.g., via control signaling) one or more conditions for uplink packet delay measurements while the cell is operating according to the energy saving mode. The UE 115 may measure uplink packet delay and transmit a signal to cause the cell to transition from the energy saving mode when the measurement satisfies one of the conditions. Thus, the UE 115 may cause the cell to leave the energy saving mode such that the UE 115 may communicate uplink packets via the cell.

Figure 2:
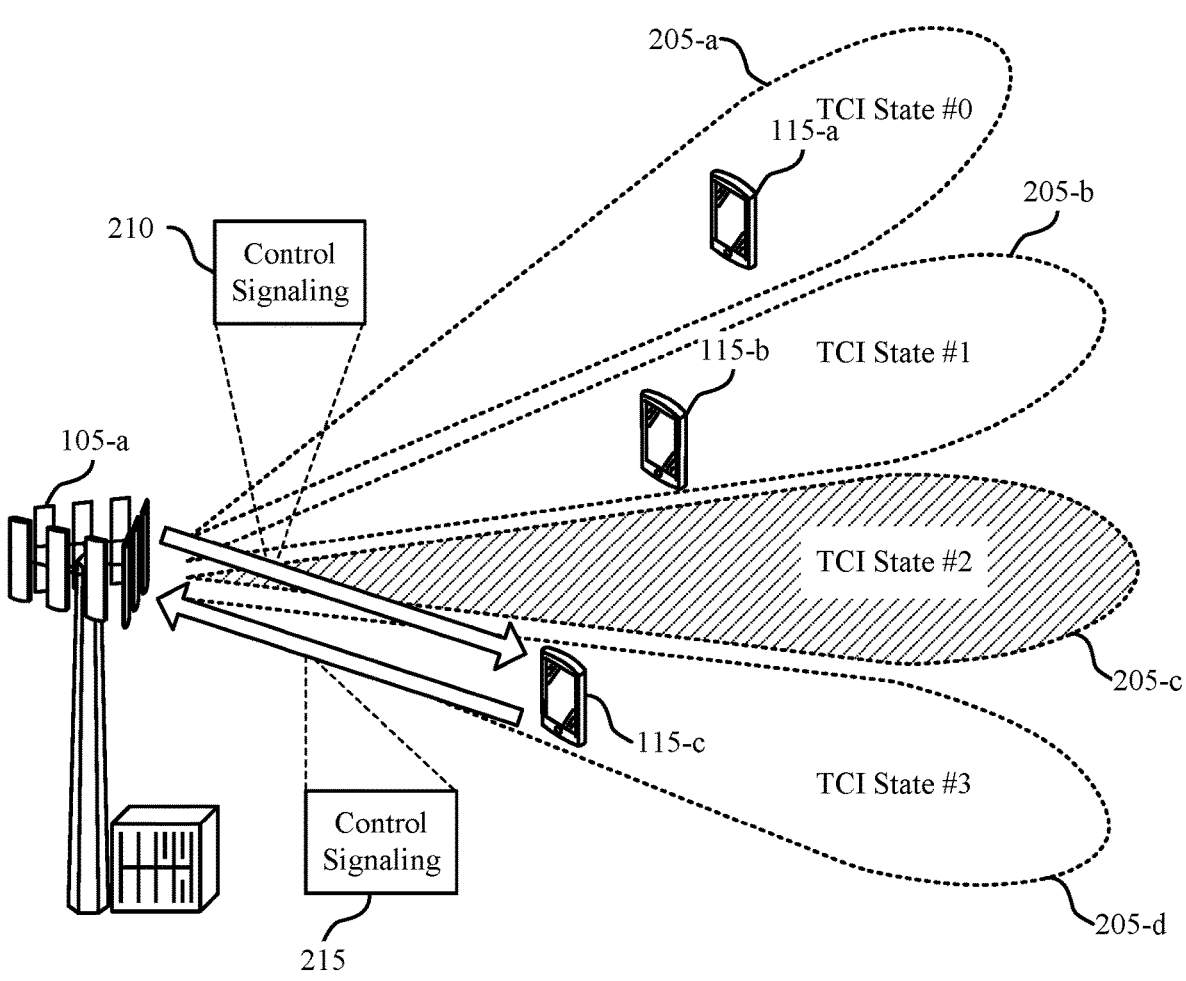
FIG. 2 illustrates an example of a wireless communications system that supports uplink packet delay measurement for network energy savings in accordance with one or more aspects of the present disclosure.

FIG. 2 illustrates an example of a wireless communications system 200 that supports uplink packet delay measurement for network energy savings in accordance with one or more aspects of the present disclosure. The wireless communications system 200 includes a network entity 105-a and a UE 115-a, a UE 115-b, and a UE 115-c, which may be examples of the network entities 105 and the UEs 115, as described herein with respect to FIG. 1.

As described herein, the UEs 115 and the network entity 105-a may implement various techniques to support energy savings and reduced power consumption. In some cases, the network entity 105-a may support cell switching on/off such that the network entity 105-a may enter a "sleep" or power savings mode, which may result in network entity savings. The network entity 105-a may use semi-static and/or dynamic signaling (e.g., to UEs 115) or periodic configurations to switch cells on or off in various time-domain granularities (e.g., TTIs), such as subframes, slots, and/or symbols. The various time domain techniques in support of switching cells on and off may be applicable for single component carrier and multi-component carrier cases. The use of grouping of UEs 115 and the interaction of UE groups in support of network energy savings may be applicable.

The network entity 105-a may consider various communication conditions in evaluating whether to switch one or more cells to an off or on state. Such conditions may include the load level in the cell and the delay requirements for both UL and DL communications. To evaluate the cell load, the network entity may measure the cell load in both UL and DL communication links, and the cell load may be measured in terms of physical resource block (PRB) utilization (e.g., percentage of occupied PRBs in the cell). PRB utilization measured for both DL and UL may be measured on a per cell basis, per beam (e.g., a synchronization signal block (SSB) area) basis, per RAN slice basis, or for MIMO. Additionally, PRB utilization may be measured for total traffic or for guaranteed bit rate (GBR) traffic only. The cell load metrics described herein may be determined by the network entity 105-a.

The delay requirements for both UL and DL traffic may be determined by the network entity 105-a per data radio bearer based on RRC connection establishment with one or more UEs 115. The network entity 105-b may measure the packet delay for DL communications and evaluate the measured DL packet delay relative to the DL packet delay requirements. For UL packet delay, the network entity 105-b may receive UL packet delay measurements from the UEs 115 and evaluate the received measurements relative to the UL packet delay requirements. The measurements that the UE 115 transmits may include the UL PDCP packet delay and/or the UL PDCP excess packet delay per data radio bearer (DRB). UL PDCP packet delay refers to the delay in the UL DRB may refer to a PDCP queuing delay for DRBs at the UE 115. The UL PDCP packet delay measurement may capture the delay from packet arrival at the PDCP upper service access point (SAP) until the UL grant to transmit the packet is available. The measurement may be performed by a UE 115 separately per DRB. The UL PDCP excess packet delay per DRB measurement may represent the ratio of packets in UL per DRB exceeding the configured delay threshold among the UL PDCP service data units (SDUs) received. The delay for each packet is calculated from packet arrival at PDCP upper SAP until the UL grant to transmit the packet is available, which has included the delay the UE gets resources granted (from sending SR/RACH to receiving the first grant). The measurement may be performed separately per DRB.

In some cases, these UL packet delay measurements (e.g., UL PDCP packet delay and UL PDCP excess packet delay per DRB) may not be adequate for use by the network entity 105-a in determining whether to switch a cell to an off state or enter the energy saving mode. In an example scenario, the UE 115-a identifies a low activity (e.g., low cell load) in the cell supported by the network entity 105-a, and the network entity 105-a has identified the delay requirements for both DL and UL based on RRC connections with the UEs 115. The network entity 105-a may determine that the delay requirements are not stringent (e.g., in the order of 8 to 10 ms). The network entity 105-a may measure the DL packet delays and determine that no DL packet is delayed higher than a threshold measurement. The network entity 105-a requests (e.g., via control signaling) that the UEs 115 report the PDCP packet delay measurements, and the network entity 105-a receives the measurements and determines that the delay measurements are below a threshold value. In such cases, the network entity 105-a may determine to switch a cell to an off state based on the cell load and the packet delay requirements. However, several errors may exist in the time window corresponding to the measurement, such as beam to beam blocking in a frequency (e.g., frequency 2 (FR2)). As illustrated in FIG. 2, a beam 205-c corresponding to transmission configuration indicator (TCI) state 2 may impact communications with UE 115-c via beam 205-d corresponding to TCI state 3, communications with UE 115-b via a beam 205-b corresponding to TCI state 1, and/or communications with UE 115-a via a beam 205-a corresponding to TCI state 0. The beam to beam blocking may impact UL packet delay measurements, and the PDCP packet delay measurements may not account for these impacts in a manner to support a determination by the network entity 105-a of whether to switch a cell to an off state or the energy saving mode.

For example, the PDCP packet delay and the UL packet PDCP excess delay may not account for retransmission times, and the UL packet delay may be an average value that is measured over at least 120 ms based on a reportInterval configuration indicated by the network entity 105-a. The reportInterval indicates the periodicity for performing and reporting of UL PDCP Packet Average Delay per DRB measurement. For retransmissions, the network entity 105-a might be configured to add retransmissions in the UL packet PDCP delay measurement. For example, in a 120 ms interval, twenty packets are transmitted by a UE 115 and two out of the twenty packets are retransmitted. In such an example, the network entity 105- may add a retransmission time and a weight value to the received measurement. However, the added time and value may not be accurate as the network entity 105-a may not have information associated with the scheduling delay per uplink packet. Further, the 120 ms interval may be considered a long interval time to use as a criterion for triggering dynamic or static cell switching on or off. For example, the reported average delay may be suitable, but two delays that are considered in the average calculation may be significant outliers that may impact a cell switch off determination. These considerations may also be applicable to the UL packet PDCP excess delay measurement.

Techniques described herein support an UL packet delay measurement that may more adequately support the network entity 105-a in determining whether to switch a cell to an off state or enter the energy saving mode. The measurements described herein may be transmitted more frequently (e.g., via MAC-CE signaling) and may correspond to a maximum N UL PDCP packets (e.g., N=4) per UL packet PDCP delay report. Further, the measurement may be retransmission time aware, such that the UE 115 considers retransmissions in generating (e.g., calculating or computing) the UL packet delay measurement.

Additionally, the UEs 115 may evaluate each UL packet delay measurement relative to an UL packet delay threshold. If the UE 115 (e.g., UE 115-c) determines that the UL packet delay measurement exceeds the UL packet delay threshold, then the UE 115 may transmit control signaling 215 that indicates that the UL packet delay exceeds the UL packet delay threshold. The control signaling 215 may be an example of a physical uplink control channel (PUCCH) message with a bit (e.g., flag) that indicates that the threshold is exceeded or a MAC-CE message with the flag. The extra bit on the PUCCH message may be configured via control signaling 210 (e.g., RRC signaling), as such, once the bit is configured, the PUCCH resources (e.g., PRIs) may include the extra bit for signaling that the threshold is exceeded (or not). For PUCCH format 0 or 2, a cyclic shift may be applied to indicate that the threshold is exceeded (or not). In some examples, the extra PUCCH bit (or cyclic shift indication) may be RRC configured (e.g., control signaling 210) when the network entity 105-a is evaluating whether to perform a dynamic or semi-static cell switch to an off state. In some examples, the indication of whether the UL packet delay measurement exceeds the threshold is transmitted on physical uplink shared channel (PUSCH) resources or appended to the PUSCH resources as PUCCH or uplink control information (UCI) content. As such, the control signaling 215 may correspond to a PUCCH transmission, a PUSCH transmission, a UCI transmission, or a combination thereof. In some examples, the indication of that the UL packet delay exceeds the threshold or the measurement values are transmitted using MAC-CE messaging.

Further, as described herein, control signaling 210 may be transmitted by the network entity 105-*a*, and the control signaling 210 include or indicate a configuration for various aspects of UL packet delay measurements and reporting to be performed by the UE 115-*c*. The control signaling 210 may indicate a quantity of packets (e.g., N=4) that the UE 115-*c* is to evaluate per measurement, a duration during which to evaluate UL packet delay (e.g., an averaging window), the UL packet delay threshold value, the UL packet delay threshold value per DRB, per a set of DRBs, or for all DRBs, the resources to use for reporting the measurement or the indicating that the threshold is satisfied, or any combination thereof. The control signaling 210 may be an example of RRC signaling, MAC-CE signaling, downlink control information (DCI) signaling, or any combination thereof.

Further, the control signaling 210 may also indicate one or more conditions for UL packet delay measurements while the cell is operating in the energy saving mode (e.g., the off state). For example, the control signaling 210 may indicate an averaging window for measuring an average uplink packet delay while the cell is in the energy saving mode, an averaging window per DRB, resources to use to signal the cell to transition from the energy saving mode, a measurement threshold, a measurement threshold per DRB, a measurement threshold to be used for a set (e.g., all or a subset) of DRBs, a threshold ratio of packets that exceed the measurement threshold. In case the averaging window technique is used, the control signaling 210 may indicate a start and end time of the averaging window or may indicate that the start time corresponds to a time when the cell enters the energy saving mode. That is, the UE is to use the one or more conditions indicated by the control signaling 210 when the cell enters the energy saving mode.

Upon entering the energy saving mode, the cell (e.g., the network entity 105-*a* associated with the cell) may notify the UE (e.g., UE 115-*a*) that the cell is entering the energy saving mode. The UE may generate measurements of uplink packet delay while the cell is operating in the energy saving mode. If the measurement satisfies one of the conditions (e.g., the average during the window exceeds the threshold, one of the measurements exceeds the threshold, a ratio of packets exceed the measurement threshold, etc.), then the UE may transmit a signal (e.g., control signaling 215) that is configured to cause the cell to transition from the energy saving mode (e.g., to an active mode). The signal may be an example of an UL WUS or a SR. In some examples, the signal is transmitted via resources that are allocated for use while the cell is operating according to the energy saving mode.

The signal may be transmitted to the network entity 105 supporting the cell that is in the energy saving mode or to another network entity or network device. In one example, the signal is transmitted to a low power radio associated with the cell (e.g., associated with the network entity 105-*a*). In another example, the signal is transmitted to another cell (e.g., another serving cell of the UE 115). The signal may be transmitted to cause coordination at the network side, such as between network entities 105, DUs (e.g., DU 165 of FIG. 1), CUs (e.g., CU 160 of FIG. 1), or any combination thereof. This coordination (e.g., exchange of communications) in the network may cause the cell that is in the energy saving mode to transition from the energy saving mode (e.g., to an active mode) to allow the UE to transmit uplink packets via the cell.

Thus, while in the energy saving mode, the uplink packets may have some latency requirements, which may be relaxed or lower for the energy savings mode. Using these techniques herein, the UE 115 may be configured to ensure that the latency requirements are satisfied for one or more packets. That is, once a configured threshold or condition is satisfied by an UL packet at the UE, the UE 115 may use the techniques described herein to "wake-up" the cell so that the UE 115 may transmit one or more packets. Further, as described herein, the conditions may be based on the measured delay of buffered UL packets, and more specifically, the measurements may be based on instantaneous and/or average PDCP packet delay, PDCP excess packet delay, or a combination thereof. The measured delay may be used as a metric to trigger the UE 115 waking up (or sending a scheduling request to) the cell. Further, some (infrequent) uplink resources may be available to the UE 115 for sending the uplink cell, and the cell (or associated entity) may be configured to monitor for such indications in the resources. Additionally, as described herein, the signaling may be monitored for and received at a low-power radio (e.g., a wake-up radio) at the network entity 105-*a* or at an associated entity.

In some examples, the signaling indicated to the network to cause the cell to transition from the energy saving mode may include an indication of the actual delay, or in some cases, the network entity 105-*a* may be able to determine the measured delay based on transmitting the conditions (e.g., via control signaling 210) and receiving or obtaining the signal (e.g., wake up signal or scheduling request) during operations in the energy saving mode. That is, dynamic adaptation of the uplink packet delay averaging may provide more accurate uplink packet delay knowledge for the network in consideration of energy saving mode transitions.

Figure 3:
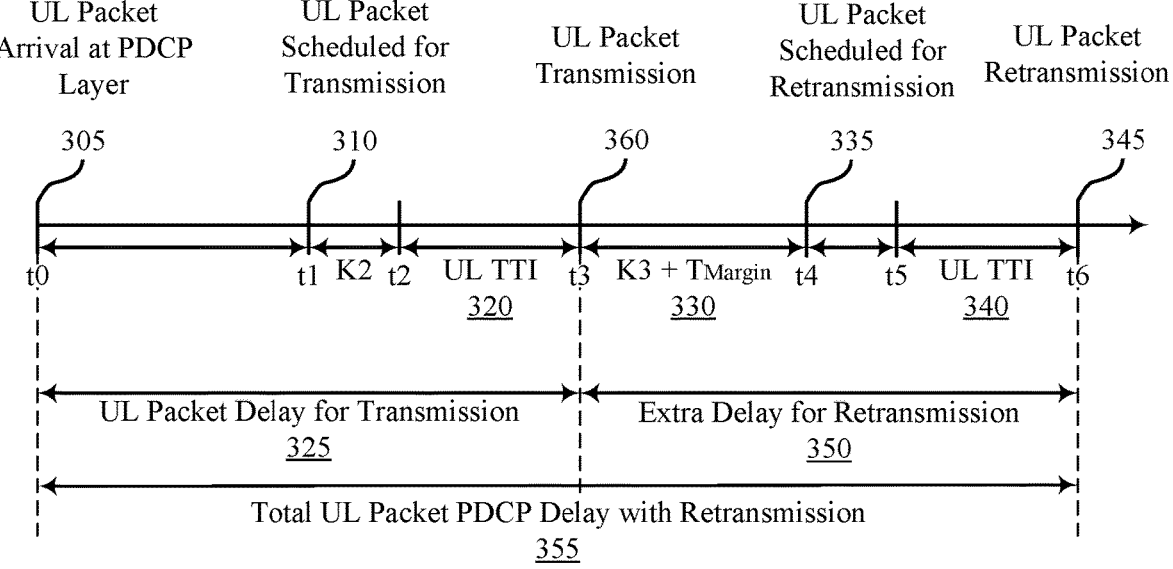
FIG. 3 illustrates an example of a measurement timeline that supports uplink packet delay measurement for network energy savings in accordance with one or more aspects of the present disclosure.

FIG. 3 illustrates an example of a measurement timeline 300 that supports uplink packet delay measurement for network energy savings in accordance with one or more aspects of the present disclosure. The measurement timeline 300 may be implemented by a UE 115, as described herein with respect to FIGS. 1 and 2. The measurement timeline 300, or various aspects thereof, may be configured by a network entity 105, as described herein with respect FIGS. 1 and 2.

The measurement timeline 300 may be used by a UE 115 when measuring UL packet delays in support of a network entity 105 determining whether to switch a cell to an off state. For example, a measurement described herein may correspond to a duration between packet arrival time at a PDCP layer (e.g., at 305) and a transmission of the packet (e.g., during UL TTI 320) or retransmission of the packet (e.g., during UL TTI 340). The duration between the packet arrival time at the PDCP layer at 305 and the transmission of the packet is an UL packet delay for transmission (e.g., duration 325), and the duration between the packet arrival time at the PDCP layer at 305 and the retransmission of the packet (at 345) is the duration 325 plus a duration 350 corresponding to the extra delay for retransmission of the packet (e.g., a total duration of 355). Thus, this measurement is different form the PDCP packet delay measurement that corresponds to a duration between the UL packet arrival time at the PDCP layer at 305 and receipt of the UL grant at 310 (e.g., "UL Packet scheduled for transmission") that schedules the transmission of the packet.

To determine the UL packet delay as described herein, the UE may monitor the duration between the arrival time at 305 of the UL packet at the PDCP layer of the UE (e.g., from an application executable on the UE) and transmission or retransmission of the packet. After transmission of the packet during UL TTI 320 at 360, the UE 115 may monitor for a transmission of another UL grant (e.g., at 335) that schedules retransmission of the packet (e.g., because the network entity was unable to decode the packet) during a duration 330, which corresponds to parameters K3+T$_{margin}$, which is a duration over which the UE is expecting or monitoring for the UL packet retransmission assignment. If the UE does not receive an uplink assignment for an UL retransmission of the packet, the UE determines that the total UL packet PDCP delay measurement is the duration 325 (e.g., the UL packet delay for transmission). If the UE receives an uplink assignment for uplink retransmission during the duration 330 (e.g., at 335), the total uplink packet PDCP delay is the duration 355, which may be the sum of the duration 325 and the duration 350.

In some examples, the delay measurement techniques described herein may be applicable when the network entity has configured the option of cell switching off at the UE and the network entity is determining UL packet delay measurements that account for both scheduling delay and retransmissions for evaluating the cell switching. In some examples, the procedure described herein for measuring UL packet delay for the case of one retransmission may be extended to measuring the UL packet delay for multiple retransmissions. As such, the total delay value may include the initial duration 325 plus multiple (e.g., N) durations 350 for retransmissions (e.g., until the UE does not receive an additional scheduling grant for retransmission). In some cases, the UE may report the measurement on a per packet basis. That is, the UE may report either the duration 325 or the duration 350 (based on the packet communication) for each packet arrival. In some cases, the UE reports the delay for each packet evaluated during a duration or for a quantity of packets. Additionally, or alternatively, the UE may report an average delay measurement evaluated over the duration or evaluated for a quantity of packets. The duration and/or the quantity may be configured at the UE using control signaling transmitted by the network entity. As such, according to the techniques described herein, the network may identify more accurate UL packet delay measurements in support of determining whether to switch a cell to an off state. For example, if the network is determining whether to switch the cell to an off state for 5 ms (e.g., a light sleep mode), then the network may configure UEs in the cell (e.g., using control signaling) to report an UL packet delay measurement (e.g., the measurement described herein) that exceeds 5 ms and or report measurements or threshold indications for a duration (e.g., 20 ms).

Figure 4:
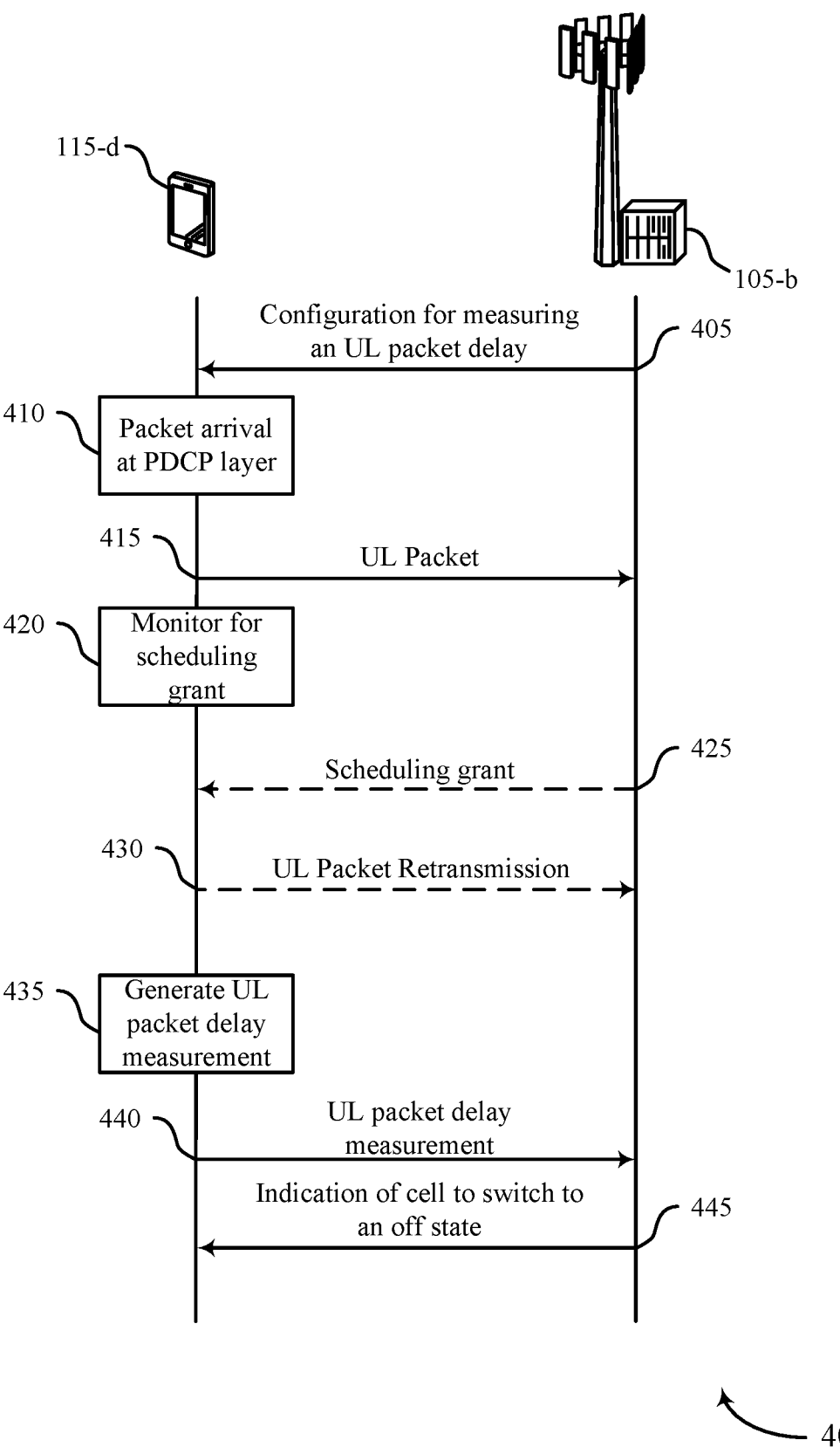
FIG. 4 illustrates an example of a process flow that supports uplink packet delay measurement for network energy savings in accordance with one or more aspects of the present disclosure.

FIG. 4 illustrates an example of a process flow 400 that supports uplink packet delay measurement for network energy savings in accordance with one or more aspects of the present disclosure. The process flow 400 may implement aspects of wireless communications systems 100 or may be implemented by aspects of the wireless communications systems 100. For example, the process flow 400 may illustrate operations between a UE 115-*d* and a network entity 105-*b*, which may be examples of corresponding devices described herein. In the following description of the process flow 400, the operations between the UE 115-*d* and the network entity 105-*b* may be transmitted in a different order than the example order shown, or the operations performed may be performed in different orders or at different times. Some operations may also be omitted from the process flow 400, and other operations may be added to the process flow 400.

At 405, the network entity 105-*b* may output control signaling, to the UE 115-*d*, that indicates a configuration that the UE 115-*d* is to use for measuring an UL packet delay for transmission of a packet. The configuration may correspond to a determination of whether the network entity is to transition a cell to an off state. In some cases, the control singling may include control information that indicates a quantity of packets of a plurality of packets. In some examples, the control signaling may include control information that indicates a duration (e.g., an averaging window) during which the UE 115-*d* is to monitor the UL packet delay for a plurality of packets. In some other examples, the control signaling may include control information that indicates a resource that the UE 115-*d* is to use for transmitting the information that indicates whether the measurement exceeds an UL packet delay threshold. In some examples, the control information is output using a RRC message. The control signaling may be an example of RRC signaling, MAC-CE signaling, DCI signaling, or a combination thereof. The control signaling may indicate other types of triggering condition (e.g., triggers transmission of an indication), such as a ratio packets in an UL per DRB exceed the configured delay threshold (e.g., an excess packet delay). In such cases, the control signaling may indicate an uplink packet delay measurement threshold per DRB, per set of DRBs, or a threshold to be used across all DRBs.

Further, the UE 115-*d* may receive control signaling, from the network entity 105-*b*, that indicates a configuration for measuring an UL packet delay for transmission of a packet. In some examples, receiving the control signaling may include receiving control information that indicates the duration (e.g., a time duration or quantity of TTIs, such as slots. frames, subframes) during which the UE 115-*d* is to monitor the UL packet delay for a plurality of packets. In some cases, the duration may be over a short duration (e.g., ~5 ms). In some other examples, receiving the control signaling may include receiving control information that indicates the quantity of packets of the plurality of packets (e.g., a quantity of packets for which to measure the UL packet delay). In some other cases, the quantity of packets may be a small quantity of packets (e.g., maximum of four) to support accurate measurements. In some other examples, receiving the control signaling may include receiving control information that indicates the resource that the UE 115-*d* is to use for transmitting the information that indicates whether the measurement exceeds the UL packet delay threshold or the resource that the UE 115-*d* is to use for transmitting an indication of the measurement (e.g., a measurement per packet or an average measurement for a plurality of packets).

At 410, the UE 115-*d* may receive a packet at the PDCP layer. In some cases, the packet may be received via an application of the UE 115-*d*. As such, the packet may include data that the UE 115-*d* is to share with another device (e.g., the network entity 105-*b*) via a communication link (e.g., an UL channel).

At 415, the UE 115-*d* may transmit the packet received at 410 to the network entity 105-*b* via an UL channel. In some cases, the network entity 105-*b* may receive the packet transmitted via the UL channel. In some other cases, the network entity 105-*b* may not receive the packet transmitted via the UL channel or may not be able to decode the received packet. In such cases, the network entity 105-*b* may schedule resources that the UE is to use for a retransmission of the packet.

At 420, the UE 115-*d* may monitor, after transmission of the packet and during a set or resources, for a scheduling grant, from the network entity 105-*b*, that schedules a resource for the retransmission of the packet. In some cases, the UE 115-*d* may determine, based at least on the monitoring, an absence of the scheduling grant during the set of resources (e.g., the transmission of the packet at 415 was successful). As such, the duration of the UL packet delay may be determined, based at least on determining the absence of the scheduling grant, to be between the packet arrival time and the transmission of the packet.

At 425, in some examples, the network entity 105-*b* may output, and the UE 115-*d* may receive, a scheduling grant that schedules a resource for retransmission of the packet. As such, outputting the scheduling grant to the UE 115-*d* may indicate to the UE 115-*d* that the transmission of the packet from the UE 115-*d* to the network entity 105-*b* was not successful.

At 430, the UE 115-*d* may transmit a retransmission of the UL packet based on receiving the scheduling grant at 425.

At 435, the UE 115-*d* may generate the measurement of the UL packet delay for transmission of the packet. The measurement may correspond to the duration between the packet arrival time at the PDCP layer of the UE 115-*d* (at 410) and the transmission (at 415) or the retransmission (at 430) of the packet. In some cases, the duration of the UL packet delay may be determined, based at least on receiving the scheduling grant, to be between the packet arrival time and the retransmission of the packet. In some other cases, there may be multiple retransmissions, and as such, operations at 415 through 425 may be repeated until the UE 115-*d* determines the absence of the scheduling grant during the set of resources indicating the network entity 105-*b* has successfully obtained the packet from the UE 115-*d*. Thus, the UL packet delay may be determined, based at least on receiving the scheduling grant (or scheduling grants for failed retransmissions), to be between the packet arrival time and the extra delay from multiple retransmissions of the packet. In some examples, the duration of the UL packet delay may be between the packet arrival time and the transmission based on the UE 115-*d* not receiving the scheduling grant at 425. That is, the UE 115-*d* may determine the absence of the scheduling grant based at least in part on the monitoring at 420. In some examples, generating the measurement may include generating an average duration between the packet arrival time and the transmission or the retransmission for each packet for a plurality of packet. For example, the generated measurement of the UL packet data may be the average of the duration for multiple packets. In some cases, the average is generated based at least on receiving the control information at 405. In some other examples, generating the measurement of the UL packet delay may correspond to the duration between the packet arrival time and a retransmission time that is subsequent to a first retransmission of the packet (e.g., the first retransmission may have failed). The measurement may be per packet in a DRB. The UE 115-*d* may evaluate an average delay or a ratio of packets with delays that exceed a threshold.

At 440, the UE 115-*d* may transmit, and the network entity 105-*b* may obtain, control signaling that indicates the generated measurement at 435. In some examples, transmitting the control signaling may include transmitting information that indicates whether the measurement exceeds an UL packet delay threshold, in response to determining if the measurement exceeds the UL packet delay threshold. In some examples, the UE 115-*d* may transmit an indication of whether the measurement exceeds the UL packet delay threshold on a resource of a PUCCH. In some cases, the indication may be a bit carried on the resource of the PUCCH or the indication may be a cyclic shift of the resource of the PUCCH. In some other cases, the UE 115-*d* may transmit the indication that the measurement exceeds the UL packet delay threshold on a control resource of a PUSCH. In some other examples, the UE 115-*d* may transmit the measurement of the UL packet delay for each packet of a plurality of packets (e.g., on a per packet basis). In some cases, the UE 115-*d* transmitting the control signaling may include transmitting a MAC-CE message that indicates the measurement of the UL packet delay. The control signaling may be transmitted in response to an excess packet delay being exceeding, meaning that a ratio of packets in a DRB exceed a configured threshold.

In some implementations, obtaining the control signaling by the network entity 105-*b* may include obtaining an average of the duration for each packet of the plurality of packets wherein the measurement is the average of the duration. In some examples, obtaining the control signaling may include obtaining information that indicates whether the measurement (or average measurement) exceeds the UL packet delay threshold. In some cases, obtaining the information may include an indication that indicates whether the measurement exceeds the UL packet delay threshold on a resource of a PUCCH. For example, the indication may be a bit carried on the resource of the PUCCH or the indication may be a cyclic shift of the resource of the PUCCH. In some other cases, obtaining the information may include obtaining an indication of whether the measurement exceeds the UL packet delay threshold on a control resource of a PUSCH. In some other implementations, obtaining the control signaling that indicates the measurement may include obtaining the measurement of the UL packet delay for each packet of the plurality of packets (e.g., on a per packet basis). In some examples, the measurement may correspond to the duration between the packet arrival time and the retransmission that is subsequent to a first retransmission of the packet (e.g., the first retransmission failed). In some cases, obtaining the control signaling may include obtaining the MAC-CE message that indicates the measurement.

At 445, the network entity 105-*b* may communicate with the UE 115-*d* based at least on the measurement of the UL packet delay. Communicating may include communication of additional uplink and downlink packets. In some examples, the network entity 105-*b* may determine to switch the cell to an off state based on the received packet delay measurement or indication. In some cases, the network entity 105-*b* may output, at 445, based at least on obtaining the control signaling from the UE 115-*d*, an indication that the cell, in which the UE may be operating in, may to switch to an off state during a TTI. As such, the UE 115-*d* may receive, based at least on transmitting the control signaling, the indication for the cell, in which the UE 115-*d* is operating in, to switch to the off state during the TTI. In some examples, the determination of whether the cell, in which the UE 115-*d* may be operating in, may be switched to an off state, may be based at least on whether the UL packet delay measurement exceeds the UL packet delay threshold. In some cases, if the measurement does exceed the UL packet delay threshold, the cell may not be switched off to avoid further increasing the UL packet delay. In some other cases, if the measurement does not exceed the UL packet delay threshold, the cell may be switched off by the network entity 105-*b* to support network energy savings.

Figure 5:
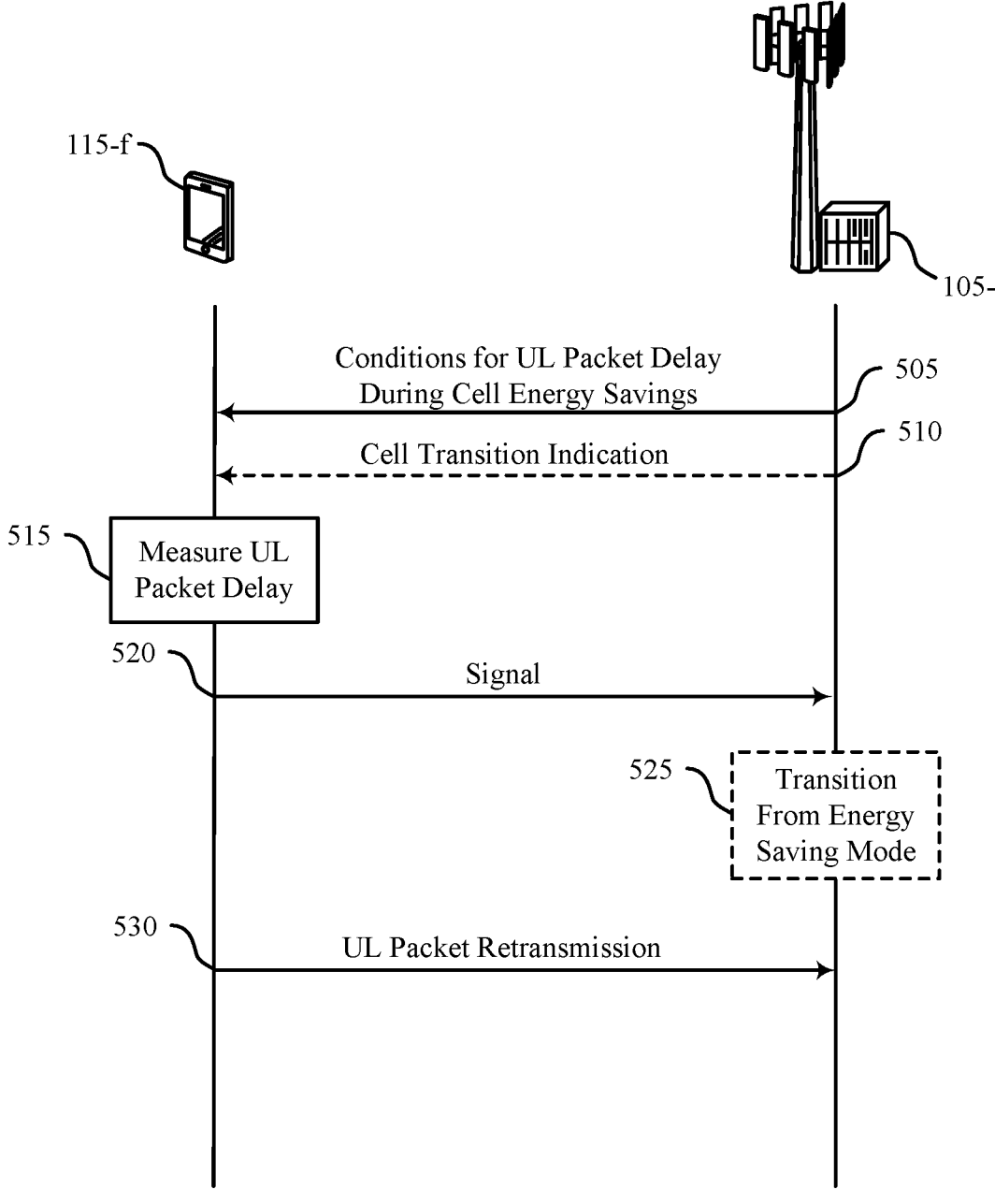
FIG. 5 illustrates an example of a process flow that supports uplink packet delay measurement for network energy savings in accordance with one or more aspects of the present disclosure.

FIG. 5 illustrates an example of a process flow 500 that supports uplink packet delay measurement for network energy savings in accordance with one or more aspects of the present disclosure. The process flow 500 may implement aspects of wireless communications systems 100 or may be implemented by aspects of the wireless communications systems 100. For example, the process flow 500 may illustrate operations between a UE 115-*d* and a network entity 105-*c*, which may be examples of corresponding devices described herein. In the following description of the process flow 500, the operations between the UE 115-*f* and the network entity 105-*c* may be transmitted in a different order than the example order shown, or the operations performed may be performed in different orders or at different times. Some operations may also be omitted from the process flow 500, and other operations may be added to the process flow 500.

At 505, the UE 115-*f* may receive, and the network entity 105-*c* may output, control signaling indicating one or more measurement conditions for uplink packet delay measurements while a cell is operating according to an energy saving mode. The control signaling may be an example of RRC, DCI, MAC-CE, or any combination thereof. The one or more measurement conditions may include an averaging window for measuring an average uplink packet delay while the cell is operating according to the energy saving mode. To indicate the averaging window, the control signaling may indicate a duration and a start time, and the start time may be based on a time when the cell transitions to operating according to the energy saving mode. The averaging window may be configured per DRB of a set of DRBs. The control signaling may indicate one or more measurement thresholds or a respective measurement threshold per DRB of a set of DRB s.

At 510, the UE 115-*f* may receive, from the network entity 105-*c*, signaling indicating the cell is to transition to the energy saving mode. The signaling may be part of control signaling at 505. The signaling may indicate a start time for the transition or operations in the energy saving mode. The signaling (or control signaling at 505) may indicate or allocate resources that the UE 115-*f* is to use for signaling the cell to transition from the energy saving mode.

At 515, the UE 115-*f* may generate a measurement for the uplink packet delay while the cell is operating according to the energy saving mode. The UE 115-*f* may measure the uplink packet delay for a set of DRB s. In some examples, the uplink packet delay is measured based on arrival time at the PDCP layer of the UE 115-*f*. The delay may correspond to a latency. The UE 115-*f* may average a packet delay across a set of packets or packets that arrive while the cell is operating in the low power mode. In some cases, the UE 115-*f* may evaluate whether the measured delay satisfies the one or more conditions set forth in the control signaling, such as an average delay threshold, ratio of packets that satisfy a threshold, etc.

At 520, the UE 115-*f* may transmit, and the network entity 105-*c* may obtain, based at least in part on the measurement satisfying the one or more measurement conditions, a signal configured to cause the cell to transition from the energy saving mode. The signal may be an example of an uplink wake up signal or a scheduling request that is configured to cause the cell to transition from the energy saving mode. The signal may be transmitted via a resource of a set of periodic resources configured for communications while the cell is operating in the energy saving mode. The signal may be transmitted to a low-power radio associated with the cell (e.g., associated with the network entity 105-*c*). The signal may be configured to cause the cell to transition from the energy saving mode (e.g., to an active mode). As described herein, the signal may not be transmitted directly the network entity 105-*c*. Rather, the signal may be transmitted via or to another cell (e.g., another serving cell of the UE 115-*f*). In cases where the signal is transmitted to another cell, the network entity supporting the other cell and the network entity 105-*c* may exchange messages. In some examples, the message exchange may be performed by the network entities 105, CUs (e.g., CU 160 of FIG. 1), DUs (e.g., DU 165), or any combination thereof. In such cases, the message exchange may cause the cell to transition from the energy saving mode (e.g., wake the cell).

At 525, the network entity 105-*c* may cause the cell to transition from the energy saving mode to the active mode.

At 530, the UE 115-*f* may transmit, and the network entity 105-*c* may obtain, one or more packets via the cell. In some examples, the one or more packets are transmitted by the UE 115-*f* in response to the UE 115-*c* receiving an indication that the cell has transitioned from the energy saving mode and to the active mode.

Figure 6:
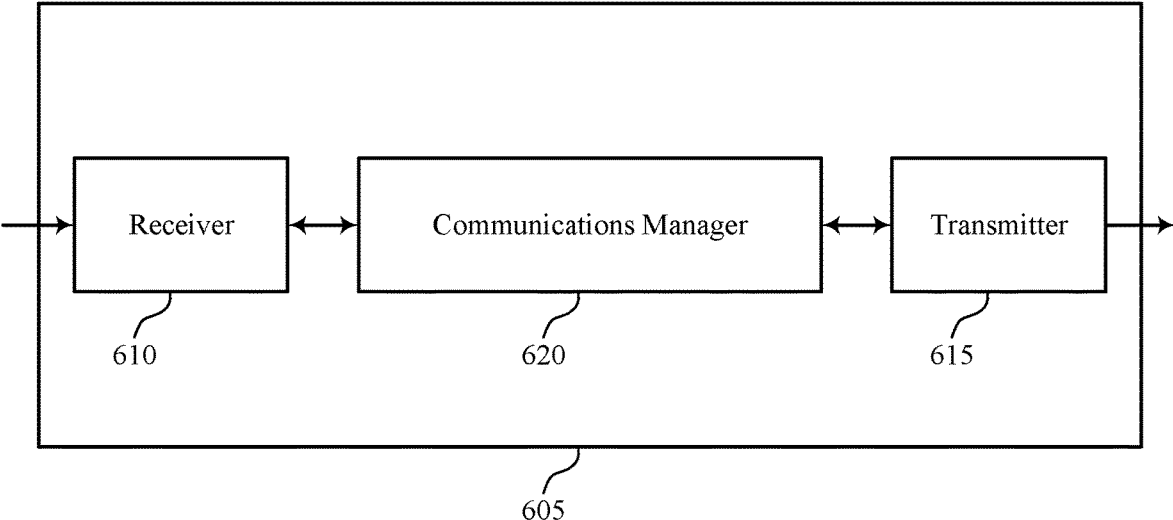
FIGS. 6 and 7 illustrate block diagrams of devices that support uplink packet delay measurement for network energy savings in accordance with one or more aspects of the present disclosure.

FIG. 6 illustrates a block diagram 600 of a device 605 that supports uplink packet delay measurement for network energy savings in accordance with one or more aspects of the present disclosure. The device 605 may be an example of aspects of a UE 115 as described herein. The device 605 may include a receiver 610, a transmitter 615, and a communications manager 620. The device 605 may also include a processor (not shown). Each of these components may be in communication with one another (e.g., via one or more buses).

The receiver 610 may provide a means for receiving information such as packets, user data, control information, or any combination thereof associated with various information channels (e.g., control channels, data channels, information channels related to uplink packet delay measurement for network energy savings). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to uplink packet delay measurement for network energy savings). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of uplink packet delay measurement for network energy savings as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor (not shown), a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

Additionally, or alternatively, the communications manager 620 may support wireless communications at a UE in accordance with examples as disclosed herein. For example, the communications manager 620 may be configured as or otherwise support a means for receiving control signaling that indicates a configuration for measuring an uplink packet delay for transmission of a packet. The communications manager 620 may be configured as or otherwise support a means for generating a measurement of the uplink packet delay for transmission of the packet, where the measurement corresponds to a duration between a packet arrival time at a packet data convergence protocol layer of the UE and a transmission or a retransmission of the packet. The communications manager 620 may be configured as or otherwise support a means for transmitting control signaling that indicates the generated measurement.

Additionally, or alternatively, the communications manager 620 may support wireless communications at a UE in accordance with examples as disclosed herein. For example, the communications manager 620 may be configured as or otherwise support a means for receiving control signaling indicating one or more measurement conditions for uplink packet delay measurements while a cell is operating according to an energy saving mode. The communications manager 620 may be configured as or otherwise support a means for generating a measurement of uplink packet delay while the cell is operating according to the energy saving mode. The communications manager 620 may be configured as or otherwise support a means for transmitting, based on the measurement satisfying the one or more measurement conditions, a signal configured to cause the cell to transition from the energy saving mode. The communications manager 620 may be configured as or otherwise support a means for transmitting, based on transmitting the signal, one or more packets via the cell.

By including or configuring the communications manager 620 in accordance with examples as described herein, the device 605 (e.g., a processor controlling or otherwise coupled with the receiver 610, the transmitter 615, the communications manager 620, or a combination thereof) may support techniques for reduced power consumption at the network and more efficient utilization of communication resources at the UE. By using UL power control measurements, the network may be able to more accurately determine whether to switch a cell to an energy saving mode, thus resulting in reduced power consumption at the network. Additionally, by switching the cell to the energy saving mode, the communication resources may not be wasted between the UE and the network entity. Further, by configuring the UE with conditions to consider to wake-up a cell, overall latency in the system may be improved by limiting packet delay in a UE while a cell is operating according to the energy saving mode. Further, processing resources may be saved by supporting the energy saving mode using techniques described herein, with reduced communications.

Figure 7:
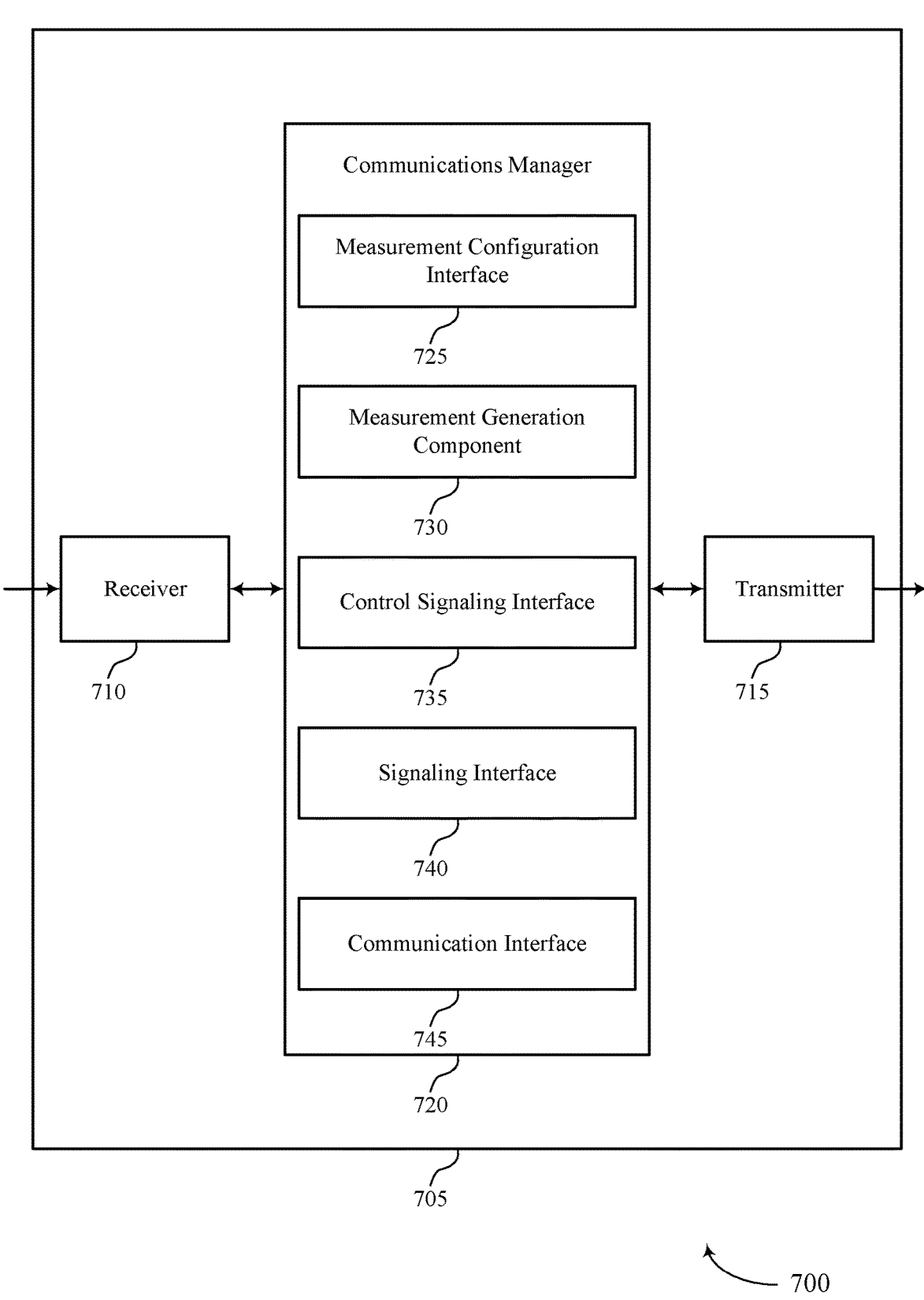

FIG. 7 illustrates a block diagram 700 of a device 705 that supports uplink packet delay measurement for network energy savings in accordance with one or more aspects of the present disclosure. The device 705 may be an example of aspects of a device 605 or a UE 115 as described herein. The device 705 may include a receiver 710, a transmitter 715, and a communications manager 720. The device 705 may also include a processor (not shown). Each of these components may be in communication with one another (e.g., via one or more buses).

The receiver 710 may provide a means for receiving information such as packets, user data, control information, or any combination thereof associated with various information channels (e.g., control channels, data channels, information channels related to uplink packet delay measurement for network energy savings). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to uplink packet delay measurement for network energy savings). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of uplink packet delay measurement for network energy savings as described herein. For example, the communications manager 720 may include a measurement configuration interface 725, a measurement generation component 730, a control signaling interface 735, a signaling interface 740, a communication interface 745, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications at a UE in accordance with examples as disclosed herein. The measurement configuration interface 725 may be configured as or otherwise support a means for receiving control signaling that indicates a configuration for measuring an uplink packet delay for transmission of a packet. The measurement generation component 730 may be configured as or otherwise support a means for generating a measurement of the uplink packet delay for transmission of the packet, where the measurement corresponds to a duration between a packet arrival time at a packet data convergence protocol layer of the UE and a transmission or a retransmission of the packet. The control signaling interface 735 may be configured as or otherwise support a means for transmitting control signaling that indicates the generated measurement.

The communications manager 720 may support wireless communications at a UE in accordance with examples as disclosed herein. The measurement configuration interface 725 may be configured as or otherwise support a means for receiving control signaling that indicates a configuration for measuring an uplink packet delay for transmission of a packet. The measurement generation component 730 may be configured as or otherwise support a means for generating a measurement of the uplink packet delay for transmission of the packet, where the measurement corresponds to a duration between a packet arrival time at a packet data convergence protocol layer of the UE and a transmission or a retransmission of the packet. The control signaling interface 735 may be configured as or otherwise support a means for transmitting control signaling that indicates the generated measurement.

Additionally, or alternatively, the communications manager 720 may support wireless communications at a UE in accordance with examples as disclosed herein. The control signaling interface 735 may be configured as or otherwise support a means for receiving control signaling indicating one or more measurement conditions for uplink packet delay measurements while a cell is operating according to an energy saving mode. The measurement generation component 730 may be configured as or otherwise support a means for generating a measurement of uplink packet delay while the cell is operating according to the energy saving mode. The signaling interface 740 may be configured as or otherwise support a means for transmitting, based on the measurement satisfying the one or more measurement conditions, a signal configured to cause the cell to transition from the energy saving mode. The communication interface 745 may be configured as or otherwise support a means for transmitting, based on transmitting the signal, one or more packets via the cell.

Figure 8:
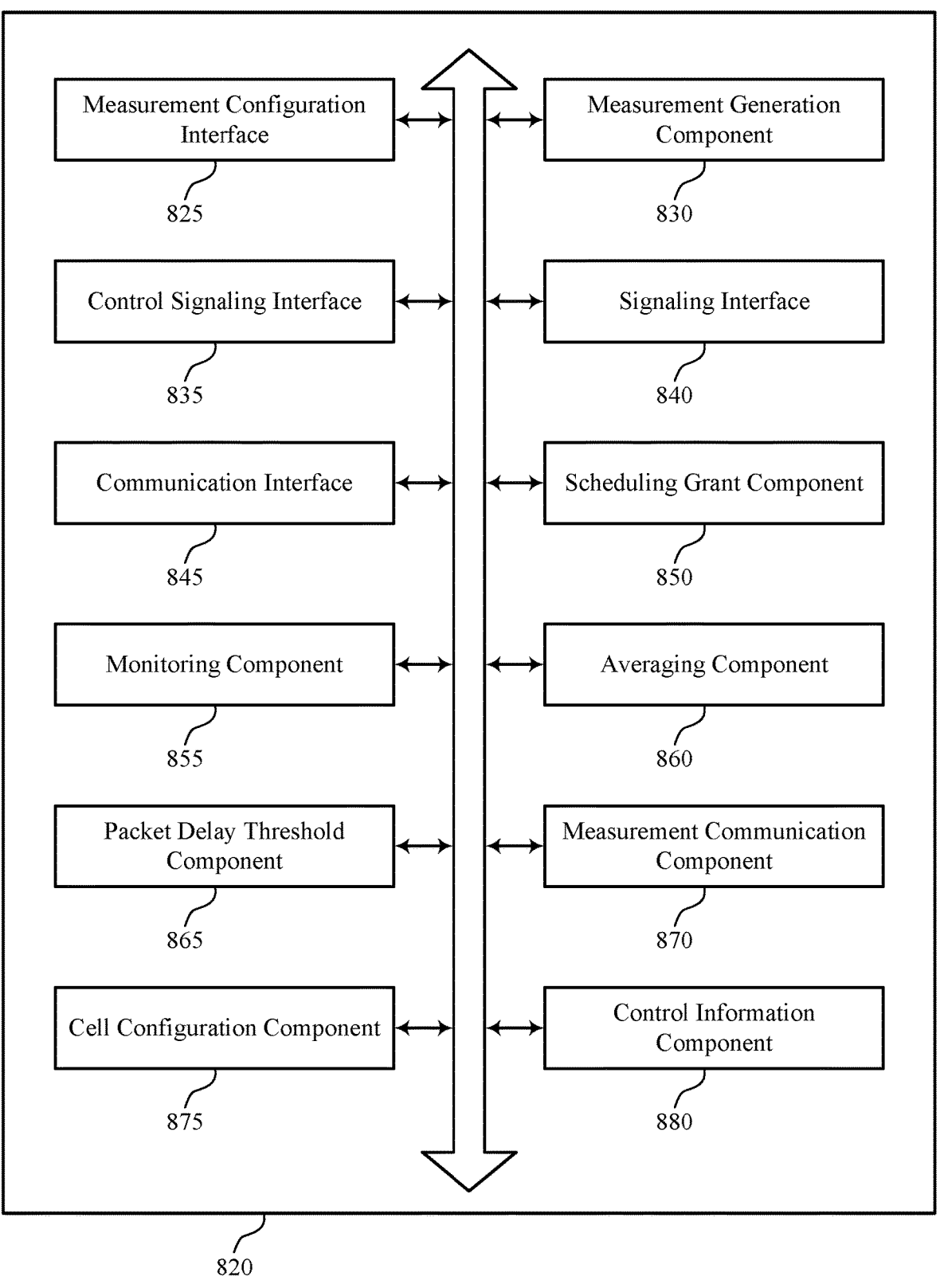
FIG. 8 illustrates a block diagram of a communications manager that supports uplink packet delay measurement for network energy savings in accordance with one or more aspects of the present disclosure.

FIG. 8 illustrates a block diagram 800 of a communications manager 820 that supports uplink packet delay measurement for network energy savings in accordance with one or more aspects of the present disclosure. The communications manager 820 may be an example of aspects of a communications manager 620, a communications manager 720, or both, as described herein. The communications manager 820, or various components thereof, may be an example of means for performing various aspects of uplink packet delay measurement for network energy savings as described herein. For example, the communications manager 820 may include a measurement configuration interface 825, a measurement generation component 830, a control signaling interface 835, a signaling interface 840, a communication interface 845, a scheduling grant component 850, a monitoring component 855, an averaging component

860, a packet delay threshold component 865, a measurement communication component 870, a cell configuration component 875, a control information component 880, or any combination thereof. Each of these components may communicate, directly or indirectly, with one another (e.g., via one or more buses).

Additionally, or alternatively, the communications manager 820 may support wireless communications at a UE in accordance with examples as disclosed herein. The measurement configuration interface 825 may be configured as or otherwise support a means for receiving control signaling that indicates a configuration for measuring an uplink packet delay for transmission of a packet. The measurement generation component 830 may be configured as or otherwise support a means for generating a measurement of the uplink packet delay for transmission of the packet, where the measurement corresponds to a duration between a packet arrival time at a packet data convergence protocol layer of the UE and a transmission or a retransmission of the packet. The control signaling interface 835 may be configured as or otherwise support a means for transmitting control signaling that indicates the generated measurement.

In some examples, the scheduling grant component 850 may be configured as or otherwise support a means for receiving, after the transmission of the packet, a scheduling grant that schedules a resource for the retransmission of the packet, where the duration is between the packet arrival time and the retransmission of the packet based on receiving the scheduling grant.

In some examples, the monitoring component 855 may be configured as or otherwise support a means for monitoring, after transmission of the packet and during a set of resources, for a scheduling grant that schedules a resource for the retransmission of the packet. In some examples, the scheduling grant component 850 may be configured as or otherwise support a means for determining, based on the monitoring, an absence of the scheduling grant during the set of resources, where the duration is between the packet arrival time and the transmission of the packet based on determining the absence of the scheduling grant.

In some examples, to support generating the measurement, the averaging component 860 may be configured as or otherwise support a means for generating an average of the duration between the packet arrival time and the transmission or the retransmission for each packet for a set of multiple packets, where the generated measurement is the average of the duration.

In some examples, to support receiving the control signaling, the control information component 880 may be configured as or otherwise support a means for receiving control information that indicates a quantity of packets of the set of multiple packets, where the average is generated based on receiving the control information.

In some examples, to support receiving the control signaling, the control signaling interface 835 may be configured as or otherwise support a means for receiving control information that indicates a duration during which the UE is to monitor the uplink packet delay for a set of multiple packets, where the measurement is generated based on measuring the uplink packet delay for the set of multiple packets during the duration.

In some examples, to support receiving the control signaling, the control signaling interface 835 may be configured as or otherwise support a means for receiving the control signaling indicating a measurement threshold to be applied to each data radio bearer of a set of data radio bearers.

In some examples, to support transmitting the control signaling, the packet delay threshold component 865 may be configured as or otherwise support a means for transmitting information that indicates whether the measurement exceeds an uplink packet delay threshold.

In some examples, to support transmitting the information that indicates whether the measurement exceeds the uplink packet delay threshold, the packet delay threshold component 865 may be configured as or otherwise support a means for transmitting an indication of whether the measurement exceeds the uplink packet delay threshold on a resource of a physical uplink control channel.

In some examples, the indication is a bit carried on the resource of the physical uplink control channel or the indication is a cyclic shift of the resource of the physical uplink control channel.

In some examples, the packet delay threshold component 865 may be configured as or otherwise support a means for determining that the measurement exceeds the uplink packet delay threshold, where the information is transmitted in response to determining that the measurement exceeds the uplink packet delay threshold.

In some examples, to support transmitting the information that indicates whether the measurement exceeds the uplink packet delay threshold, the control signaling interface 835 may be configured as or otherwise support a means for transmitting an indication that a ratio of uplink packets have measurements that exceed the uplink packet delay threshold.

In some examples, to support transmitting the information that indicates that the measurement exceeds the uplink packet delay threshold, the packet delay threshold component 865 may be configured as or otherwise support a means for transmitting an indication that the measurement exceeds the uplink packet delay threshold on a control resource of a physical uplink shared channel.

In some examples, to support receiving the control signaling, the measurement configuration interface 825 may be configured as or otherwise support a means for receiving control information that indicates a resource that the UE is to use for transmitting the information that indicates whether the measurement exceeds the uplink packet delay threshold.

In some examples, the control information is received via a radio resource control message.

In some examples, to support transmitting the control signaling, the measurement communication component 870 may be configured as or otherwise support a means for transmitting the measurement of the uplink packet delay for each packet of a set of multiple packets.

In some examples, to support generating the measurement, the measurement generation component 830 may be configured as or otherwise support a means for generating the measurement that corresponds to the duration between the packet arrival time and the retransmission that is subsequent to a first retransmission of the packet.

In some examples, to support transmitting the control signaling, the control signaling interface 835 may be configured as or otherwise support a means for transmitting a medium access control layer control element message that indicates the measurement.

In some examples, the cell configuration component 875 may be configured as or otherwise support a means for receiving, based on transmitting the control signaling, an indication that a cell in which the UE is operating is to switch to an off state during a transmission time interval.

Additionally, or alternatively, the communications manager 820 may support wireless communications at a UE in accordance with examples as disclosed herein. In some examples, the control signaling interface 835 may be configured as or otherwise support a means for receiving control signaling indicating one or more measurement conditions for uplink packet delay measurements while a cell is operating according to an energy saving mode. In some examples, the measurement generation component 830 may be configured as or otherwise support a means for generating a measurement of uplink packet delay while the cell is operating according to the energy saving mode. The signaling interface 840 may be configured as or otherwise support a means for transmitting, based on the measurement satisfying the one or more measurement conditions, a signal configured to cause the cell to transition from the energy saving mode. The communication interface 845 may be configured as or otherwise support a means for transmitting, based on transmitting the signal, one or more packets via the cell.

In some examples, to support receiving the control signaling, the averaging component 860 may be configured as or otherwise support a means for receiving the control signaling indicating at least one averaging window for measuring an average uplink packet delay while the cell is operating according to the energy saving mode.

In some examples, the control signaling indicates a duration and a start time for the at least one averaging window.

In some examples, the control signaling indicates a respective averaging window per data radio bearer of a set of data radio bearers.

In some examples, the control signaling indicates a start time for the at least one averaging window that is based on a time when the cell transitions to operating according to the energy saving mode.

In some examples, the one or more measurement conditions include an average delay threshold. In some examples, the measurement satisfies the one or more measurement conditions based on an average packet delay satisfying the average delay threshold during the at least one averaging window.

In some examples, to support receiving the control signaling, the control signaling interface 835 may be configured as or otherwise support a means for receiving the control signaling indicating a respective measurement threshold per data radio bearer of a set of data radio bearers.

In some examples, to support receiving the control signaling, the measurement configuration interface 825 may be configured as or otherwise support a means for receiving the control signaling indicating a measurement threshold to be applied to each data radio bearer of a set of data radio bearers.

In some examples, to support transmitting the signal, the signaling interface 840 may be configured as or otherwise support a means for transmitting an uplink wake up signal or a scheduling request that is configured to cause the cell to transition from the energy saving mode.

In some examples, to support transmitting the signal, the signaling interface 840 may be configured as or otherwise support a means for transmitting the signal via a resource of a set of periodic resources configured for communications while the cell is operating in the energy saving mode.

In some examples, to support transmitting the signal, the signaling interface 840 may be configured as or otherwise support a means for transmitting, to a low-power radio associated with the cell, the signal configured to cause the cell to transition from the energy saving mode.

In some examples, to support generating the measurement, the measurement generation component 830 may be configured as or otherwise support a means for generating the measurement based on a packet arrival time at a packet data convergence protocol layer of the UE.

In some examples, the measurement generation component 830 may be configured as or otherwise support a means for determining that the one or more measurement conditions are satisfied based on a ratio of packets in an uplink buffer of the UE exceeding a configured delay threshold.

In some examples, the control signaling interface 835 may be configured as or otherwise support a means for receiving signaling indicating the cell is to transition to the energy saving mode, where the measurement is generated based on receiving the signaling.

Figure 9:
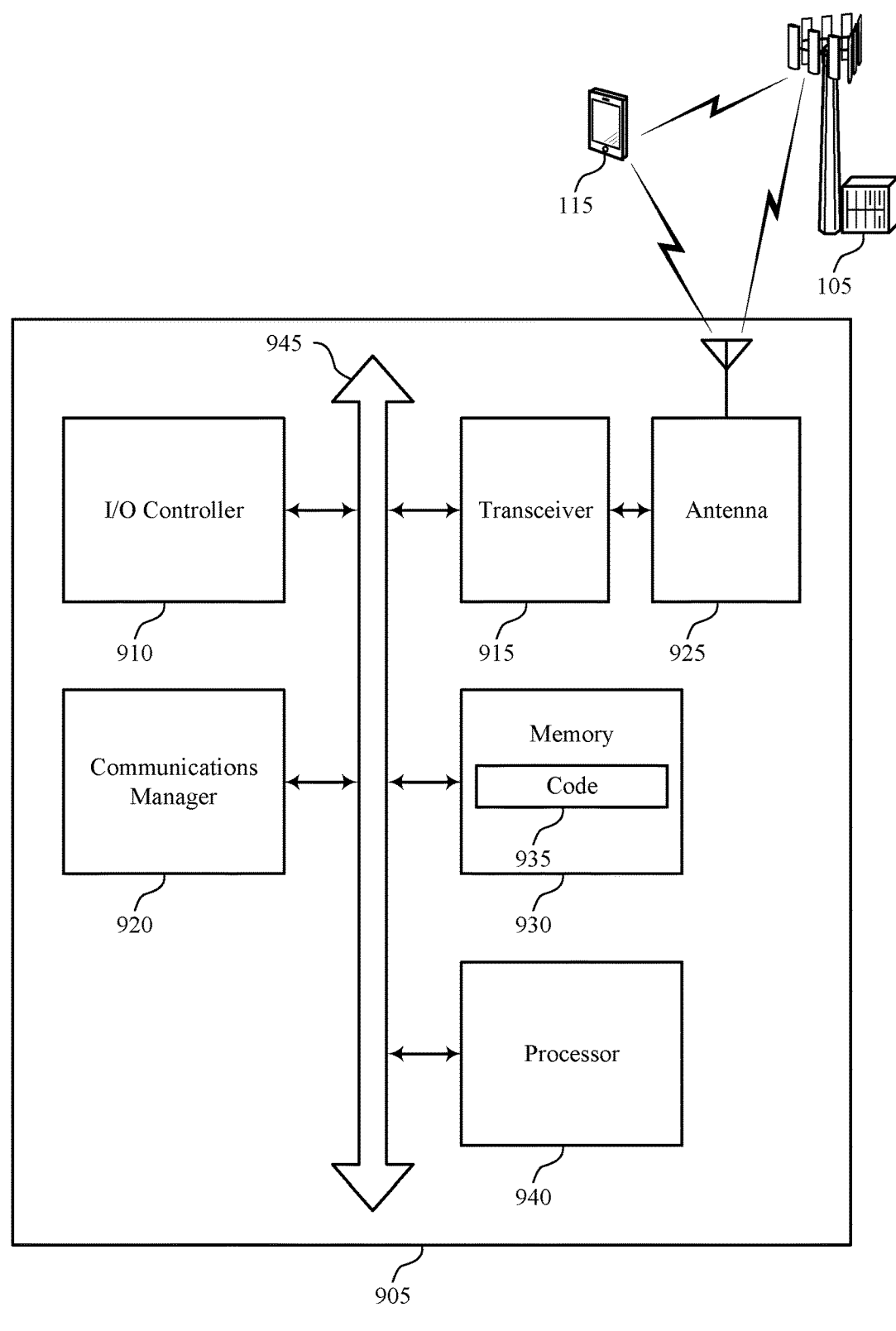
FIG. 9 illustrates a diagram of a system including a device that supports uplink packet delay measurement for network energy savings in accordance with one or more aspects of the present disclosure.

FIG. 9 illustrates a diagram of a system 900 including a device 905 that supports uplink packet delay measurement for network energy savings in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930 (e.g., at least one memory 930), code 935, and a processor 940 (e.g., at least one processor 940). These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting uplink packet delay measurement for network energy savings). For example, the device 905 or a component of the device 905 may include a processor 940 and memory 930 coupled with or to the processor 940, the processor 940 and memory 930 configured to perform various functions described herein.

Additionally, or alternatively, the communications manager 920 may support wireless communications at a UE in accordance with examples as disclosed herein. For example, the communications manager 920 may be configured as or otherwise support a means for receiving control signaling that indicates a configuration for measuring an uplink packet delay for transmission of a packet. The communications manager 920 may be configured as or otherwise support a means for generating a measurement of the uplink packet delay for transmission of the packet, where the measurement corresponds to a duration between a packet arrival time at a packet data convergence protocol layer of the UE and a transmission or a retransmission of the packet. The communications manager 920 may be configured as or otherwise support a means for transmitting control signaling that indicates the generated measurement.

Additionally, or alternatively, the communications manager 920 may support wireless communications at a UE in accordance with examples as disclosed herein. For example, the communications manager 920 may be configured as or otherwise support a means for receiving control signaling indicating one or more measurement conditions for uplink packet delay measurements while a cell is operating according to an energy saving mode. The communications manager 920 may be configured as or otherwise support a means for generating a measurement of uplink packet delay while the cell is operating according to the energy saving mode. The communications manager 920 may be configured as or otherwise support a means for transmitting, based on the measurement satisfying the one or more measurement conditions, a signal configured to cause the cell to transition from the energy saving mode. The communications manager 920 may be configured as or otherwise support a means for transmitting, based on transmitting the signal, one or more packets via the cell.

By including or configuring the communications manager 920 in accordance with examples as described herein, the device 905 may support techniques for reduced power consumption at the network and more efficient utilization of communication resources at the UE. By using UL power control measurements, the network may be able to more accurately determine whether to switch a cell to an energy saving mode, thus resulting in reduced power consumption at the network. Additionally, by switching the cell to the energy saving mode, the communication resources may not be wasted between the UE and the network entity. Further, by configuring the UE with conditions to consider to wake-up a cell, overall latency in the system may be improved by limiting packet delay in a UE while a cell is operating according to the energy saving mode. Further, processing resources may be saved by supporting the energy saving mode using techniques described herein, with reduced communications.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described herein with reference to the communications manager 920 may be supported by or performed by the processor 940, the memory 930, the code 935, or any combination thereof. For example, the code 935 may include instructions executable by the processor 940 to cause the device 905 to perform various aspects of uplink packet delay measurement for network energy savings as described herein, or the processor 940 and the memory 930 may be otherwise configured to perform or support such operations.

Figure 10:
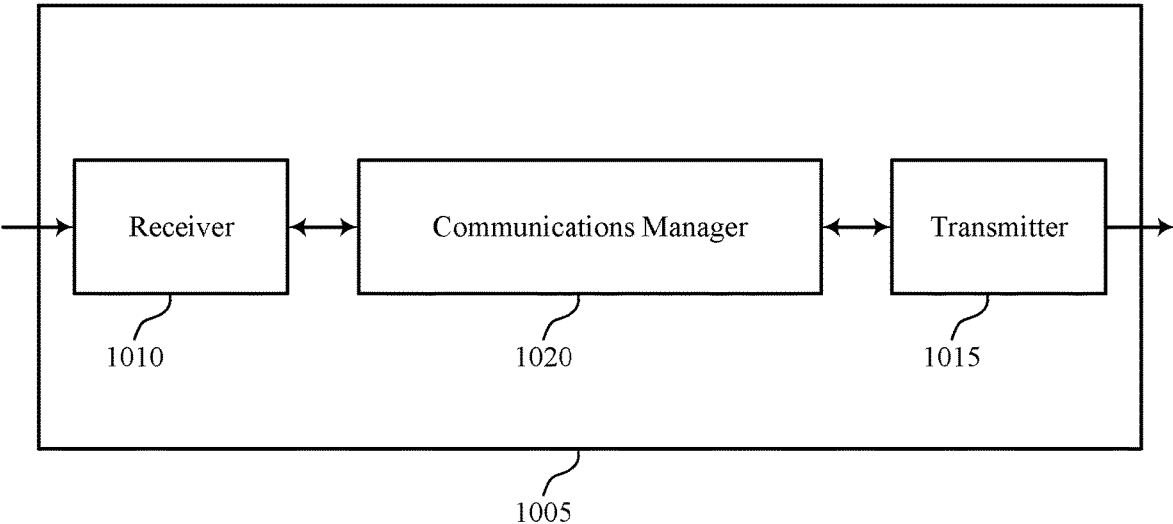
FIGS. 10 and 11 illustrate block diagrams of devices that support uplink packet delay measurement for network energy savings in accordance with one or more aspects of the present disclosure.

FIG. 10 illustrates a block diagram 1000 of a device 1005 that supports uplink packet delay measurement for network energy savings in accordance with one or more aspects of the present disclosure. The device 1005 may be an example of aspects of a network entity 105 as described herein. The device 1005 may include a receiver 1010, a transmitter 1015, and a communications manager 1020. The device 1005 may also include a processor (not shown). Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., UQ samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The communications manager 1020, the receiver 1010, the transmitter 1015, or various combinations thereof or various components thereof may be examples of means for performing various aspects of uplink packet delay measurement for network energy savings as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor (not shown), a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described herein in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

Additionally, or alternatively, the communications manager 1020 may support wireless communication at a network entity in accordance with examples as disclosed herein. For example, the communications manager 1020 may be configured as or otherwise support a means for outputting control signaling that indicates a configuration that a UE is to use for measuring an uplink packet delay for transmission of packet, where the configuration corresponds to a determination of whether the network entity is to transition a cell to an off state. The communications manager 1020 may be configured as or otherwise support a means for obtaining control signaling that indicates a measurement of the uplink packet delay, where the measurement corresponds to a duration between a packet arrival time at a packet data convergence protocol layer of the UE and a transmission or a retransmission of the packet in accordance with the configuration. The communications manager 1020 may be configured as or otherwise support a means for communicating based at least in part on the measurement and the determination.

Additionally, or alternatively, the communications manager 1020 may support wireless communications at a network entity in accordance with examples as disclosed herein. For example, the communications manager 1020 may be configured as or otherwise support a means for outputting control signaling indicating one or more measurement conditions for uplink packet delay measurements while a cell is operating according to an energy saving mode. The communications manager 1020 may be configured as or otherwise support a means for obtaining, based at least in part on outputting the control signaling, a signal that is configured to cause the cell associated with the network entity to transition from the energy saving mode. The communications manager 1020 may be configured as or otherwise support a means for obtaining, based at least in part on obtaining the signal; a packet that is transmitted via the cell.

By including or configuring the communications manager 1020 in accordance with examples as described herein, the device 1005 (e.g., a processor controlling or otherwise coupled with the receiver 1010, the transmitter 1015, the communications manager 1020, or a combination thereof) may support techniques for reduced power consumption at the network and more efficient utilization of communication resources at the UE. By using UL power control measurements, the network may be able to more accurately determine whether to switch a cell to an energy saving mode, thus resulting in reduced power consumption at the network. Additionally, by switching the cell to the energy saving mode, the communication resources may not be wasted between the UE and the network entity. Further, by configuring the UE with conditions to consider to wake-up a cell, overall latency in the system may be improved by limiting packet delay in a UE while a cell is operating according to the energy saving mode. Further, processing resources may be saved by supporting the energy saving mode using techniques described herein, with reduced communications.

Figure 11:
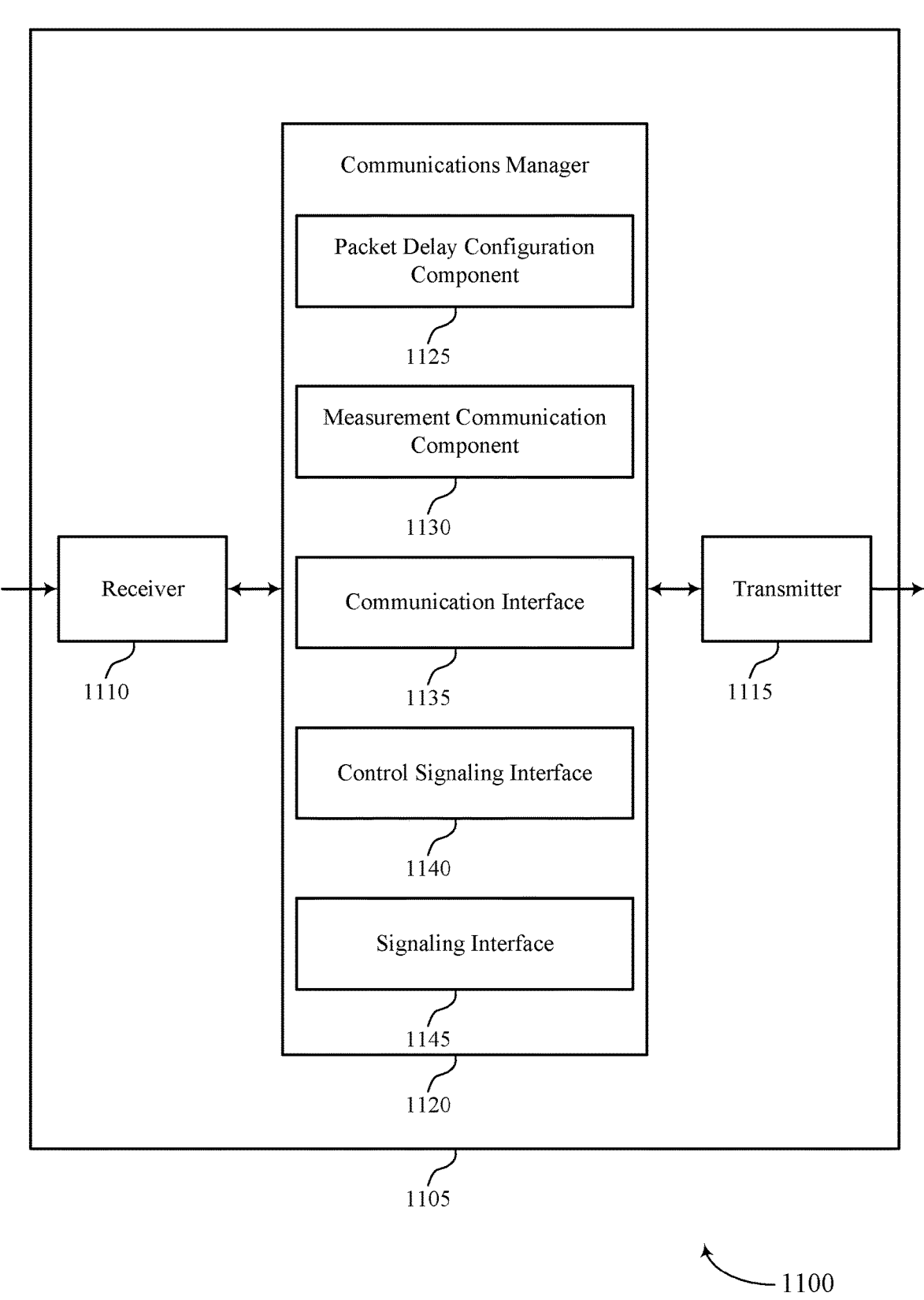

FIG. 11 illustrates a block diagram 1100 of a device 1105 that supports uplink packet delay measurement for network energy savings in accordance with one or more aspects of the present disclosure. The device 1105 may be an example of aspects of a device 1005 or a network entity 105 as described herein. The device 1105 may include a receiver 1110, a transmitter 1115, and a communications manager 1120. The device 1105 may also include a processor (not shown). Each of these components may be in communication with one another (e.g., via one or more buses).

The receiver 1110 may provide a means for obtaining (e.g., receiving, determining, identifying) information such as user data, control information, or any combination thereof (e.g., UQ samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., UQ samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The device 1105, or various components thereof, may be an example of means for performing various aspects of uplink packet delay measurement for network energy savings as described herein. For example, the communications manager 1120 may include a packet delay configuration component 1125, a measurement communication component 1130, a communication interface 1135, a control signaling interface 1140, a signaling interface 1145, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communication at a network entity in accordance with examples as disclosed herein. The packet delay configuration component 1125 may be configured as or otherwise support a means for outputting control signaling that indicates a configuration that a UE is to use for measuring an uplink packet delay for transmission of packet, where the configuration corresponds to a determination of whether the network entity is to transition a cell to an off state. The measurement communication component 1130 may be configured as or otherwise support a means for obtaining control signaling that indicates a measurement of the uplink packet delay, where the measurement corresponds to a duration between a packet arrival time at a packet data convergence protocol layer of the UE and a transmission or a retransmission of the packet in accordance with the configuration. The communication interface 1135 may be configured as or otherwise support a means for communicating based on the measurement and the determination.

Additionally, or alternatively, the communications manager 1120 may support wireless communications at a network entity in accordance with examples as disclosed herein. The control signaling interface 1140 may be configured as or otherwise support a means for outputting control signaling indicating one or more measurement conditions for uplink packet delay measurements while a cell is operating according to an energy saving mode. The signaling interface 1145 may be configured as or otherwise support a means for obtaining, based on outputting the control signaling, a signal that is configured to cause the cell associated with the network entity to transition from the energy saving mode. The communication interface 1135 may be configured as or otherwise support a means for obtaining, based on obtaining the signal; a packet that is transmitted via the cell.

Figure 12:
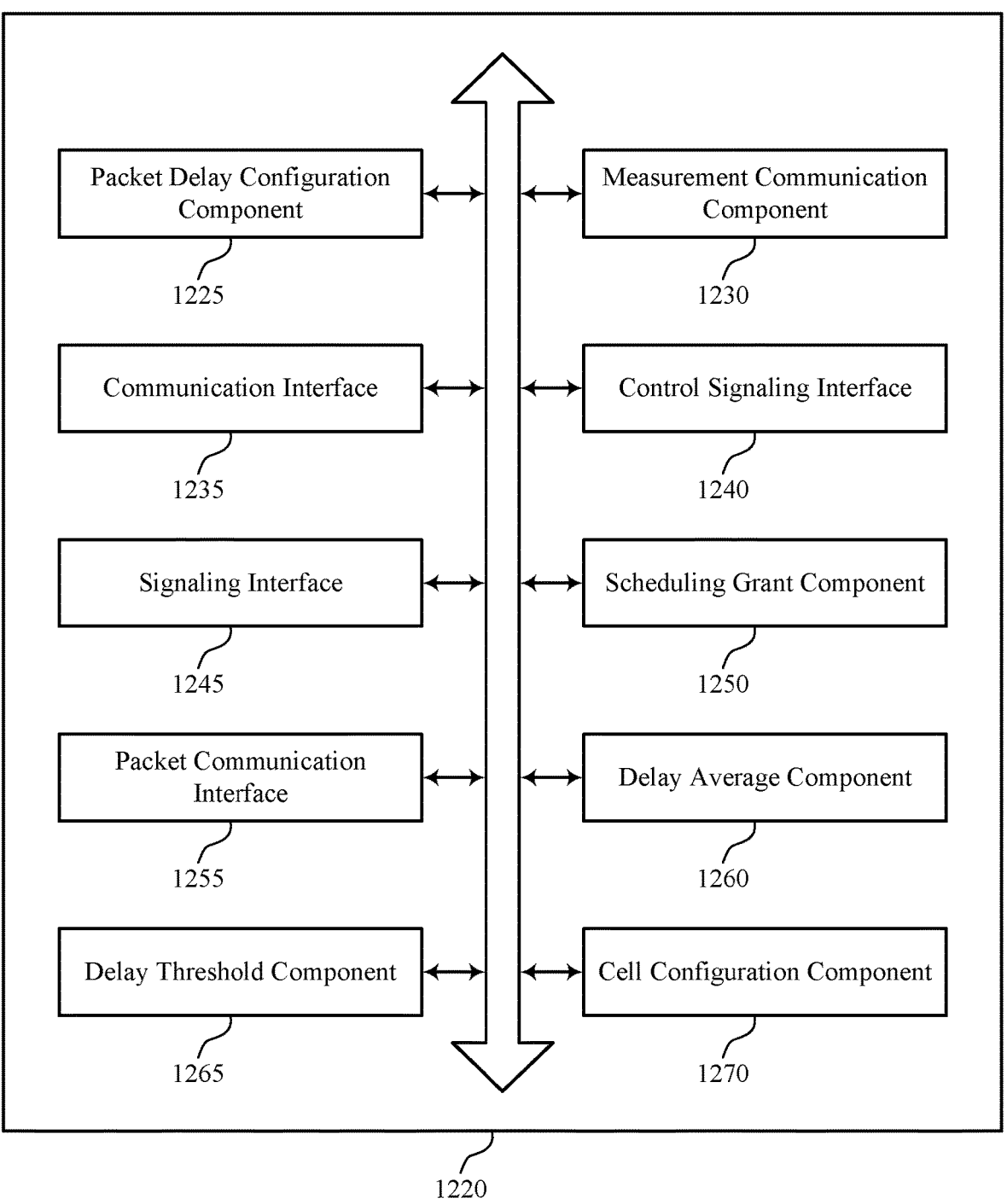
FIG. 12 illustrates a block diagram of a communications manager that supports uplink packet delay measurement for network energy savings in accordance with one or more aspects of the present disclosure.

FIG. 12 illustrates a block diagram 1200 of a communications manager 1220 that supports uplink packet delay measurement for network energy savings in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of uplink packet delay measurement for network energy savings as described herein. For example, the communications manager 1220 may include a packet delay configuration component 1225, a measurement communication component 1230, a communication interface 1235, a control signaling interface 1240, a signaling interface 1245, a scheduling grant component 1250, a packet communication interface 1255, a delay average component 1260, a delay threshold component 1265, a cell configuration component 1270, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

Additionally, or alternatively, the communications manager 1220 may support wireless communication at a network entity in accordance with examples as disclosed herein. The packet delay configuration component 1225 may be configured as or otherwise support a means for outputting control signaling that indicates a configuration that a UE is to use for measuring an uplink packet delay for transmission of packet, where the configuration corresponds to a determination of whether the network entity is to transition a cell to an off state. The measurement communication component 1230 may be configured as or otherwise support a means for obtaining control signaling that indicates a measurement of the uplink packet delay, where the measurement corresponds to a duration between a packet arrival time at a packet data convergence protocol layer of the UE and a transmission or a retransmission of the packet in accordance with the configuration. The communication interface 1235 may be configured as or otherwise support a means for communicating based on the measurement and the determination.

In some examples, the scheduling grant component 1250 may be configured as or otherwise support a means for outputting a scheduling grant that schedules a resource for retransmission of the packet, where the duration is between the packet arrival time and the retransmission of the packet based on receiving the scheduling grant.

In some examples, the packet communication interface 1255 may be configured as or otherwise support a means for obtaining the transmission of the packet, where the duration is between the packet arrival time and the transmission of the packet based on obtaining the transmission of the packet.

In some examples, to support obtaining the control signaling, the delay average component 1260 may be configured as or otherwise support a means for obtaining an average of the duration for each packet of a set of multiple packets, where the measurement is the average of the duration.

In some examples, to support outputting the control signaling, the packet delay configuration component 1225 may be configured as or otherwise support a means for outputting control information that indicates a quantity of packets of the set of multiple packets, where the control signaling that indicates the measurement is obtained based on outputting the control signaling.

In some examples, to support outputting the control signaling, the packet delay configuration component 1225 may be configured as or otherwise support a means for outputting control information that indicates a duration during which the UE is to monitor the uplink packet delay for a set of multiple packets, where the control signaling that indicates the measurement is obtained based on outputting the control signaling.

In some examples, to support outputting the control signaling, the packet delay configuration component 1225 may be configured as or otherwise support a means for outputting the control signaling indicating a measurement threshold to be applied to each data radio bearer of a set of data radio bearers.

In some examples, to support obtaining the control signaling, the delay threshold component 1265 may be configured as or otherwise support a means for obtaining information that indicates whether the measurement exceeds an uplink packet delay threshold.

In some examples, to support obtaining the information, the delay threshold component 1265 may be configured as or otherwise support a means for obtaining an indication that indicates whether the measurement exceeds the uplink packet delay threshold on a resource of a physical uplink control channel.

In some examples, the indication is a bit carried on the resource of the physical uplink control channel or the indication is a cyclic shift of the resource of the physical uplink control channel.

In some examples, the information indicates that the measurement exceeds the uplink packet delay threshold.

In some examples, to support obtaining the information, the delay threshold component 1265 may be configured as or otherwise support a means for obtaining an indication of whether the measurement exceeds the uplink packet delay threshold on a control resource of a physical uplink shared channel.

In some examples, to support obtaining the information, the delay threshold component 1265 may be configured as or otherwise support a means for obtaining an indication that a ratio of uplink packets have measurements that exceed the uplink packet delay threshold.

In some examples, to support outputting the control signaling, the packet delay configuration component 1225 may be configured as or otherwise support a means for outputting control information that indicates a resource that the UE is to use for transmitting the information that indicates whether the measurement exceeds the uplink packet delay threshold.

In some examples, the control information is output using a radio resource control message.

In some examples, to support obtaining the control signaling that indicates the measurement, the measurement communication component 1230 may be configured as or otherwise support a means for obtaining the measurement of the uplink packet delay for each packet of a set of multiple packets.

In some examples, to support obtaining the control signaling that indicates the measurement, the measurement communication component 1230 may be configured as or otherwise support a means for obtaining the measurement that corresponds to the duration between the packet arrival time and the retransmission that is subsequent to a first retransmission of the packet.

In some examples, to support obtaining the control signaling, the measurement communication component 1230 may be configured as or otherwise support a means for obtaining a medium access control layer control element message that indicates the measurement.

In some examples, the cell configuration component 1270 may be configured as or otherwise support a means for outputting, based at least on obtaining the control signaling, an indication that a cell in which the UE is operating is to switch to an off state during a transmission time interval.

Additionally, or alternatively, the communications manager 1220 may support wireless communications at a network entity in accordance with examples as disclosed herein. The control signaling interface 1240 may be configured as or otherwise support a means for outputting control signaling indicating one or more measurement conditions for uplink packet delay measurements while a cell is operating according to an energy saving mode. The signaling interface 1245 may be configured as or otherwise support a means for obtaining, based on outputting the control signaling, a signal that is configured to cause the cell associated with the network entity to transition from the energy saving mode. In some examples, the communication interface 1235 may be configured as or otherwise support a means for obtaining, based on obtaining the signal; a packet that is transmitted via the cell.

In some examples, to support outputting the control signaling, the control signaling interface 1240 may be configured as or otherwise support a means for outputting the control signaling indicating at least one averaging window for measuring an average uplink packet delay while the cell is operating according to the energy saving mode.

In some examples, the control signaling indicates a duration and a start time for the at least one averaging window.

In some examples, the control signaling indicates a respective averaging window per data radio bearer of a set of data radio bearers.

In some examples, the control signaling indicates a start time for the at least one averaging window that is based on a time when the cell transitions to operating according to the energy saving mode.

In some examples, the one or more measurement conditions include an average delay threshold.

In some examples, to support outputting the control signaling, the delay threshold component 1265 may be configured as or otherwise support a means for outputting the control signaling indicating a respective measurement threshold per data radio bearer of a set of data radio bearers.

In some examples, to support outputting the control signaling, the measurement communication component 1230 may be configured as or otherwise support a means for outputting the control signaling indicating a measurement threshold to be applied to each data radio bearer of a set of data radio bearers.

In some examples, to support obtaining the signal, the signaling interface 1245 may be configured as or otherwise support a means for obtaining an uplink wake up signal or a scheduling request to cause the cell to transition from the energy saving mode.

In some examples, to support obtaining the signal, the signaling interface 1245 may be configured as or otherwise support a means for obtaining the signal via a resource of a set of periodic resources configured for communications while the cell is operating in the energy saving mode.

In some examples, to support obtaining the signal, the signaling interface 1245 may be configured as or otherwise support a means for obtaining the signal from a low-power radio associated with the cell.

Figure 13:
FIG. 13 illustrates a diagram of a system including a device that supports uplink packet delay measurement for network energy savings in accordance with one or more aspects of the present disclosure.

FIG. 13 illustrates a diagram of a system 1300 including a device 1305 that supports uplink packet delay measurement for network energy savings in accordance with one or more aspects of the present disclosure. The device 1305 may be an example of or include the components of a device 1005, a device 1105, or a network entity 105 as described herein. The device 1305 may communicate with one or more network entities 105, one or more UEs 115, or any combination thereof, which may include communications over one or more wired interfaces, over one or more wireless interfaces, or any combination thereof. The device 1305 may include components that support outputting and obtaining communications, such as a communications manager 1320, a transceiver 1310, an antenna 1315, a memory 1325 (e.g., at least one memory 1325), code 1330, and a processor 1335 (e.g., at least one processor 1335). These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless transmissions (e.g., concurrently). The transceiver 1310 may also include a modem to modulate signals, to provide the modulated signals for transmission (e.g., by one or more antennas 1315, by a wired transmitter), to receive modulated signals (e.g., from one or more antennas 1315, from a wired receiver), and to demodulate signals. In some implementations, the transceiver 1310 may include one or more interfaces, such as one or more interfaces coupled with the one or more antennas 1315 that are configured to support various receiving or obtaining operations, or one or more interfaces coupled with the one or more antennas 1315 that are configured to support various transmitting or outputting operations, or a combination thereof. In some implementations, the transceiver 1310 may include or be configured for coupling with one or more processors or memory components that are operable to perform or support operations based on received or obtained information or signals, or to generate information or other signals for transmission or other outputting, or any combination thereof. In some implementations, the transceiver 1310, or the transceiver 1310 and the one or more antennas 1315, or the transceiver 1310 and the one or more antennas 1315 and one or more processors or memory components (for example, the processor 1335, or the memory 1325, or both), may be included in a chip or chip assembly that is installed in the device 1305. In some examples, the transceiver may be operable to support communications via one or more communications links (e.g., a communication link 125, a backhaul communication link 120, a midhaul communication link 162, a fronthaul communication link 168).

The memory 1325 may include RAM and ROM. The memory 1325 may store computer-readable, computer-executable code 1330 including instructions that, when executed by the processor 1335, cause the device 1305 to perform various functions described herein. The code 1330 may be stored in a non-transitory computer-readable medium such as system memory or another type of memory. In some cases, the code 1330 may not be directly executable by the processor 1335 but may cause a computer (e.g., when compiled and executed) to perform functions described herein. In some cases, the memory 1325 may contain, among other things, a BIOS which may control basic hardware or software operation such as the interaction with peripheral components or devices.

The processor 1335 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1335 may be configured to operate a memory array using a memory controller. In some other cases, a memory controller may be integrated into the processor 1335. The processor 1335 may be configured to execute computer-readable instructions stored in a memory (e.g., the memory 1325) to cause the device 1305 to perform various functions (e.g., functions or tasks supporting uplink packet delay measurement for network energy savings). For example, the device 1305 or a component of the device 1305 may include a processor 1335 and memory 1325 coupled with the processor 1335, the processor 1335 and memory 1325 configured to perform various functions described herein. The processor 1335 may be an example of a cloud-computing platform (e.g., one or more physical nodes and supporting software such as operating systems, virtual machines, or container instances) that may host the functions (e.g., by executing code 1330) to perform the functions of the device 1305. The processor 1335 may be any one or more suitable processors capable of executing scripts or instructions of one or more software programs stored in the device 1305 (such as within the memory 1325). In some implementations, the processor 1335 may be a component of a processing system. A processing system may generally refer to a system or series of machines or components that receives inputs and processes the inputs to produce a set of outputs (which may be passed to other systems or components of, for example, the device 1305). For example, a processing system of the device 1305 may refer to a system including the various other components or subcomponents of the device 1305, such as the processor 1335, or the transceiver 1310, or the communications manager 1320, or other components or combinations of components of the device 1305. The processing system of the device 1305 may interface with other components of the device 1305, and may process information received from other components (such as inputs or signals) or output information to other components. For example, a chip or modem of the device 1305 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1305 may transmit information output from the chip or modem. Additionally, or alternatively, in some implementations, the one or more interfaces may refer to an interface between the processing system of the chip or modem and a receiver, such that the device 1305 may obtain information or signal inputs, and the information may be passed to the processing system. A person having ordinary skill in the art will readily recognize that a first interface also may obtain information or signal inputs, and a second interface also may output information or signal outputs.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the memory 1325, the code 1330, and the processor 1335 may be located in one of the different components or divided between different components).

In some examples, the communications manager 1320 may manage aspects of communications with a core network 130 (e.g., via one or more wired or wireless backhaul links). For example, the communications manager 1320 may manage the transfer of data communications for client devices, such as one or more UEs 115. In some examples, the communications manager 1320 may manage communications with other network entities 105, and may include a controller or scheduler for controlling communications with UEs 115 in cooperation with other network entities 105. In some examples, the communications manager 1320 may support an X2 interface within an LTE/LTE-A wireless communications network technology to provide communication between network entities 105.

Additionally, or alternatively, the communications manager 1320 may support wireless communication at a network entity in accordance with examples as disclosed herein. For example, the communications manager 1320 may be configured as or otherwise support a means for outputting control signaling that indicates a configuration that a UE is to use for measuring an uplink packet delay for transmission of packet, where the configuration corresponds to a determination of whether the network entity is to transition a cell to an off state. The communications manager 1320 may be configured as or otherwise support a means for obtaining control signaling that indicates a measurement of the uplink packet delay, where the measurement corresponds to a duration between a packet arrival time at a packet data convergence protocol layer of the UE and a transmission or a retransmission of the packet in accordance with the configuration. The communications manager 1320 may be configured as or otherwise support a means for communicating based at least in part on the measurement and the determination.

Additionally, or alternatively, the communications manager 1320 may support wireless communications at a network entity in accordance with examples as disclosed herein. For example, the communications manager 1320 may be configured as or otherwise support a means for outputting control signaling indicating one or more measurement conditions for uplink packet delay measurements while a cell is operating according to an energy saving mode.

The communications manager 1320 may be configured as or otherwise support a means for obtaining, based at least in part on outputting the control signaling, a signal that is configured to cause the cell associated with the network entity to transition from the energy saving mode. The communications manager 1320 may be configured as or otherwise support a means for obtaining, based at least in part on obtaining the signal; a packet that is transmitted via the cell.

By including or configuring the communications manager 1320 in accordance with examples as described herein, the device 1305 may support techniques for reduced power consumption at the network and more efficient utilization of communication resources at the UE. By using UL power control measurements, the network may be able to more accurately determine whether to switch a cell to an energy saving mode, thus resulting in reduced power consumption at the network. Additionally, by switching the cell to the energy saving mode, the communication resources may not be wasted between the UE and the network entity. Further, by configuring the UE with conditions to consider to wake-up a cell, overall latency in the system may be improved by limiting packet delay in a UE while a cell is operating according to the energy saving mode. Further, processing resources may be saved by supporting the energy saving mode using techniques described herein, with reduced communications.

In some examples, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof. Although the communications manager 1320 is illustrated as a separate component, in some examples, one or more functions described herein with reference to the communications manager 1320 may be supported by or performed by the transceiver 1310, the processor 1335, the memory 1325, the code 1330, or any combination thereof. For example, the code 1330 may include instructions executable by the processor 1335 to cause the device 1305 to perform various aspects of uplink packet delay measurement for network energy savings as described herein, or the processor 1335 and the memory 1325 may be otherwise configured to perform or support such operations.

FIG. 14 illustrates a flowchart illustrating a method 1400 that supports uplink packet delay measurement for network energy savings in accordance with one or more aspects of the present disclosure. The operations of the method 1400 may be implemented by a UE or its components as described herein. For example, the operations of the method 1400 may be performed by a UE 115 as described herein with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1405, the method may include receiving control signaling that indicates a configuration for measuring an uplink packet delay for transmission of a packet. The operations of 1405 may be performed in accordance with examples as disclosed herein. In some examples, aspects of the operations of 1405 may be performed by a measurement configuration interface 825 as described herein with reference to FIG. 8.

At 1410, the method may include generating a measurement of the uplink packet delay for transmission of the packet, where the measurement corresponds to a duration between a packet arrival time at a packet data convergence protocol layer of the UE and a transmission or a retransmission of the packet. The operations of 1410 may be performed in accordance with examples as disclosed herein. In some examples, aspects of the operations of 1410 may be performed by a measurement generation component 830 as described herein with reference to FIG. 8.

At 1415, the method may include transmitting control signaling that indicates the generated measurement. The operations of 1415 may be performed in accordance with examples as disclosed herein. In some examples, aspects of the operations of 1415 may be performed by a control signaling interface 835 as described herein with reference to FIG. 8.

FIG. 15 illustrates a flowchart illustrating a method 1500 that supports uplink packet delay measurement for network energy savings in accordance with one or more aspects of the present disclosure. The operations of the method 1500 may be implemented by a UE or its components as described herein. For example, the operations of the method 1500 may be performed by a UE 115 as described herein with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1505, the method may include receiving control signaling that indicates a configuration for measuring an uplink packet delay for transmission of a packet. The operations of 1505 may be performed in accordance with examples as disclosed herein. In some examples, aspects of the operations of 1505 may be performed by a measurement configuration interface 825 as described herein with reference to FIG. 8.

At 1510, the method may include receiving, after the transmission of the packet, a scheduling grant that schedules a resource for the retransmission of the packet, where the duration is between the packet arrival time and the retransmission of the packet based at least in part on receiving the scheduling grant. The operations of 1510 may be performed in accordance with examples as disclosed herein. In some examples, aspects of the operations of 1510 may be performed by a scheduling grant component 850 as described herein with reference to FIG. 8.

At 1515, the method may include generating a measurement of the uplink packet delay for transmission of the packet, where the measurement corresponds to a duration between a packet arrival time at a packet data convergence protocol layer of the UE and a transmission or a retransmission of the packet. The operations of 1515 may be performed in accordance with examples as disclosed herein. In some examples, aspects of the operations of 1515 may be performed by a measurement generation component 830 as described herein with reference to FIG. 8.

At 1520, the method may include transmitting control signaling that indicates the generated measurement. The operations of 1520 may be performed in accordance with examples as disclosed herein. In some examples, aspects of the operations of 1520 may be performed by a control signaling interface 835 as described herein with reference to FIG. 8.

Figure 16:
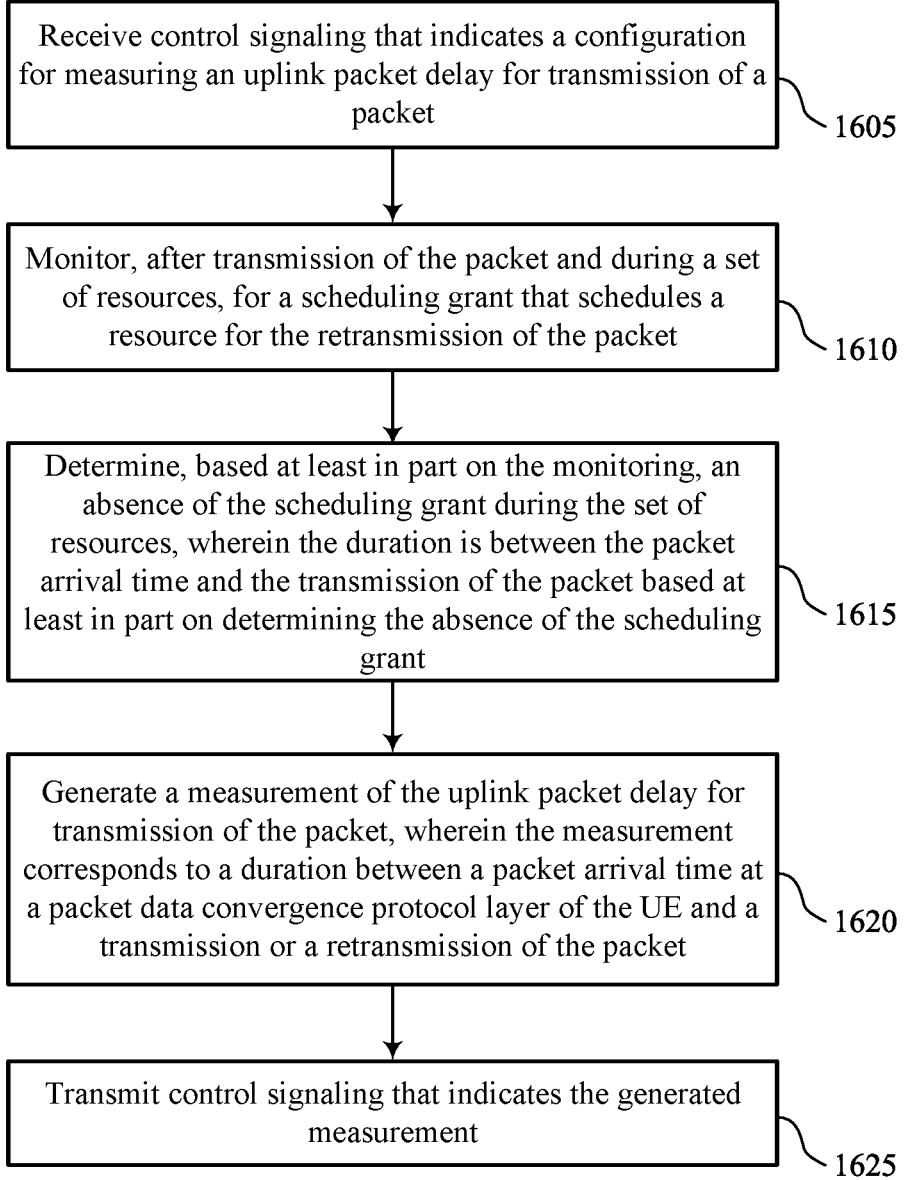

FIG. 16 illustrates a flowchart illustrating a method 1600 that supports uplink packet delay measurement for network energy savings in accordance with one or more aspects of the present disclosure. The operations of the method 1600 may be implemented by a UE or its components as described herein. For example, the operations of the method 1600 may be performed by a UE 115 as described herein with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1605, the method may include receiving control signaling that indicates a configuration for measuring an uplink packet delay for transmission of a packet. The operations of 1605 may be performed in accordance with examples as disclosed herein. In some examples, aspects of the operations of 1605 may be performed by a measurement configuration interface 825 as described herein with reference to FIG. 8.

At 1610, the method may include monitoring, after transmission of the packet and during a set of resources, for a scheduling grant that schedules a resource for the retransmission of the packet. The operations of 1610 may be performed in accordance with examples as disclosed herein. In some examples, aspects of the operations of 1610 may be performed by a monitoring component 855 as described herein with reference to FIG. 8.

At 1615, the method may include determining, based at least in part on the monitoring, an absence of the scheduling grant during the set of resources, where the duration is between the packet arrival time and the transmission of the packet based at least in part on determining the absence of the scheduling grant. The operations of 1615 may be performed in accordance with examples as disclosed herein. In some examples, aspects of the operations of 1615 may be performed by a scheduling grant component 850 as described herein with reference to FIG. 8.

At 1620, the method may include generating a measurement of the uplink packet delay for transmission of the packet, where the measurement corresponds to a duration between a packet arrival time at a packet data convergence protocol layer of the UE and a transmission or a retransmission of the packet. The operations of 1620 may be performed in accordance with examples as disclosed herein. In some examples, aspects of the operations of 1620 may be performed by a measurement generation component 830 as described herein with reference to FIG. 8.

At 1625, the method may include transmitting control signaling that indicates the generated measurement. The operations of 1625 may be performed in accordance with examples as disclosed herein. In some examples, aspects of the operations of 1625 may be performed by a control signaling interface 835 as described herein with reference to FIG. 8.

FIG. 17 illustrates a flowchart illustrating a method 1700 that supports uplink packet delay measurement for network energy savings in accordance with one or more aspects of the present disclosure. The operations of the method 1700 may be implemented by a network entity or its components as described herein. For example, the operations of the method 1700 may be performed by a network entity as described herein with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1705, the method may include outputting control signaling that indicates a configuration that a UE is to use for measuring an uplink packet delay for transmission of packet, where the configuration corresponds to a determination of whether the network entity is to transition a cell to an off state. The operations of 1705 may be performed in accordance with examples as disclosed herein. In some examples, aspects of the operations of 1705 may be performed by a packet delay configuration component 1225 as described herein with reference to FIG. 12.

At 1710, the method may include obtaining control signaling that indicates a measurement of the uplink packet delay, where the measurement corresponds to a duration between a packet arrival time at a packet data convergence protocol layer of the UE and a transmission or a retransmission of the packet in accordance with the configuration. The operations of 1710 may be performed in accordance with examples as disclosed herein. In some examples, aspects of the operations of 1710 may be performed by a measurement communication component 1230 as described herein with reference to FIG. 12.

At 1715, the method may include communicating based at least in part on the measurement and the determination. The operations of 1715 may be performed in accordance with examples as disclosed herein. In some examples, aspects of the operations of 1715 may be performed by a communication interface 1235 as described herein with reference to FIG. 12.

FIG. 18 illustrates a flowchart illustrating a method 1800 that supports uplink packet delay measurement for network energy savings in accordance with one or more aspects of the present disclosure. The operations of the method 1800 may be implemented by a UE or its components as described herein. For example, the operations of the method 1800 may be performed by a UE 115 as described herein with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1805, the method may include receiving control signaling indicating one or more measurement conditions for uplink packet delay measurements while a cell is operating according to an energy saving mode. The operations of 1805 may be performed in accordance with examples as disclosed herein. In some examples, aspects of the operations of 1805 may be performed by a control signaling interface 835 as described herein with reference to FIG. 8.

At 1810, the method may include generating a measurement of uplink packet delay while the cell is operating according to the energy saving mode. The operations of 1810 may be performed in accordance with examples as disclosed herein. In some examples, aspects of the operations of 1810 may be performed by a measurement generation component 830 as described herein with reference to FIG. 8.

At 1815, the method may include transmitting, based at least in part on the measurement satisfying the one or more measurement conditions, a signal configured to cause the cell to transition from the energy saving mode. The operations of 1815 may be performed in accordance with examples as disclosed herein. In some examples, aspects of the operations of 1815 may be performed by a signaling interface 840 as described herein with reference to FIG. 8.

At 1820, the method may include transmitting, based at least in part on transmitting the signal, one or more packets via the cell. The operations of 1820 may be performed in accordance with examples as disclosed herein. In some examples, aspects of the operations of 1820 may be performed by a communication interface 845 as described herein with reference to FIG. 8.

FIG. 19 illustrates a flowchart illustrating a method 1900 that supports uplink packet delay measurement for network energy savings in accordance with one or more aspects of the present disclosure. The operations of the method 1900 may be implemented by a network entity or its components as described herein. For example, the operations of the method 1900 may be performed by a network entity as described herein with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1905, the method may include outputting control signaling indicating one or more measurement conditions for uplink packet delay measurements while a cell is operating according to an energy saving mode. The operations of 1905 may be performed in accordance with examples as disclosed herein. In some examples, aspects of the operations of 1905 may be performed by a control signaling interface 1240 as described herein with reference to FIG. 12.

At 1910, the method may include obtaining, based at least in part on outputting the control signaling, a signal that is configured to cause the cell associated with the network entity to transition from the energy saving mode. The operations of 1910 may be performed in accordance with examples as disclosed herein. In some examples, aspects of the operations of 1910 may be performed by a signaling interface 1245 as described herein with reference to FIG. 12.

At 1915, the method may include obtaining, based at least in part on obtaining the signal; a packet that is transmitted via the cell. The operations of 1915 may be performed in accordance with examples as disclosed herein. In some examples, aspects of the operations of 1915 may be performed by a communication interface 1235 as described herein with reference to FIG. 12.

The following provides an overview of aspects of the present disclosure:

Aspect 1: A method for wireless communications at a UE, comprising: receiving control signaling that indicates a configuration for measuring an uplink packet delay for transmission of a packet; generating a measurement of the uplink packet delay for transmission of the packet, wherein the measurement corresponds to a duration between a packet arrival time at a packet data convergence protocol layer of the UE and a transmission or a retransmission of the packet; and transmitting control signaling that indicates the generated measurement.

Aspect 2: The method of aspect 1, further comprising: receiving, after the transmission of the packet, a scheduling grant that schedules a resource for the retransmission of the packet, wherein the duration is between the packet arrival time and the retransmission of the packet based at least in part on receiving the scheduling grant.

Aspect 3: The method of aspect 1, further comprising: monitoring, after transmission of the packet and during a set of resources, for a scheduling grant that schedules a resource for the retransmission of the packet; and determining, based at least in part on the monitoring, an absence of the scheduling grant during the set of resources, wherein the duration is between the packet arrival time and the transmission of the packet based at least in part on determining the absence of the scheduling grant.

Aspect 4: The method of any of aspects 1 through 3, wherein generating the measurement comprises: generating an average of the duration between the packet arrival time and the transmission or the retransmission for each packet for a plurality of packets, wherein the generated measurement is the average of the duration.

Aspect 5: The method of aspect 4, wherein receiving the control signaling comprises: receiving control information that indicates a quantity of packets of the plurality of packets, wherein the average is generated based at least in part on receiving the control information.

Aspect 6: The method of any of aspects 1 through 5, wherein receiving the control signaling comprises: receiving control information that indicates a duration during which the UE is to monitor the uplink packet delay for a plurality of packets, wherein the measurement is generated based at least in part on measuring the uplink packet delay for the plurality of packets during the duration.

Aspect 7: The method of any of aspects 1 through 6, wherein receiving the control signaling comprises: receiving the control signaling indicating a measurement threshold to be applied to each data radio bearer of a set of data radio bearers.

Aspect 8: The method of any of aspects 1 through 7, wherein transmitting the control signaling comprises: transmitting information that indicates whether the measurement exceeds an uplink packet delay threshold.

Aspect 9: The method of aspect 8, wherein transmitting the information that indicates whether the measurement exceeds the uplink packet delay threshold comprises: transmitting an indication of whether the measurement exceeds the uplink packet delay threshold on a resource of a physical uplink control channel.

Aspect 10: The method of aspect 9, wherein the indication is a bit carried on the resource of the physical uplink control channel or the indication is a cyclic shift of the resource of the physical uplink control channel.

Aspect 11: The method of any of aspects 8 through 10, further comprising: determining that the measurement exceeds the uplink packet delay threshold, wherein the information is transmitted in response to determining that the measurement exceeds the uplink packet delay threshold.

Aspect 12: The method of any of aspects 8 through 11, wherein transmitting the information that indicates whether the measurement exceeds the uplink packet delay threshold comprises: transmitting an indication that a ratio of uplink packets have measurements that exceed the uplink packet delay threshold.

Aspect 13: The method of any of aspects 8 through 12, wherein transmitting the information that indicates that the measurement exceeds the uplink packet delay threshold comprises: transmitting an indication that the measurement exceeds the uplink packet delay threshold on a control resource of a physical uplink shared channel.

Aspect 14: The method of any of aspects 8 through 13, wherein receiving the control signaling comprises: receiving control information that indicates a resource that the UE is to use for transmitting the information that indicates whether the measurement exceeds the uplink packet delay threshold.

Aspect 15: The method of aspect 14, wherein the control information is received via a radio resource control message.

Aspect 16: The method of any of aspects 1 through 15, wherein transmitting the control signaling comprises: transmitting the measurement of the uplink packet delay for each packet of a plurality of packets.

Aspect 17: The method of any of aspects 1 through 16, wherein generating the measurement comprises: generating the measurement that corresponds to the duration between the packet arrival time and the retransmission that is subsequent to a first retransmission of the packet.

Aspect 18: The method of any of aspects 1 through 17, wherein transmitting the control signaling comprises: transmitting a medium access control layer control element message that indicates the measurement.

Aspect 19: The method of any of aspects 1 through 18, further comprising: receiving, based at least in part on transmitting the control signaling, an indication that a cell in which the UE is operating is to switch to an off state during a transmission time interval.

Aspect 20: A method for wireless communication at a network entity, comprising: outputting control signaling that indicates a configuration that a UE is to use for measuring an uplink packet delay for transmission of packet, wherein the configuration corresponds to a determination of whether the network entity is to transition a cell to an off state; obtaining control signaling that indicates a measurement of the uplink packet delay, wherein the measurement corresponds to a duration between a packet arrival time at a packet data convergence protocol layer of the UE and a transmission or a retransmission of the packet in accordance with the configuration; and communicating based at least in part on the measurement and the determination.

Aspect 21: The method of aspect 20, further comprising: outputting a scheduling grant that schedules a resource for retransmission of the packet, wherein the duration is between the packet arrival time and the retransmission of the packet based at least in part on receiving the scheduling grant.

Aspect 22: The method of any of aspects 20 through 21, further comprising: obtaining the transmission of the packet, wherein the duration is between the packet arrival time and the transmission of the packet based at least in part on obtaining the transmission of the packet.

Aspect 23: The method of any of aspects 20 through 22, wherein obtaining the control signaling comprises: obtaining an average of the duration for each packet of a plurality of packets, wherein the measurement is the average of the duration.

Aspect 24: The method of aspect 23, wherein outputting the control signaling comprises: outputting control information that indicates a quantity of packets of the plurality of packets, wherein the control signaling that indicates the measurement is obtained based at least in part on outputting the control signaling.

Aspect 25: The method of any of aspects 20 through 24, wherein outputting the control signaling comprises: outputting control information that indicates a duration during which the UE is to monitor the uplink packet delay for a plurality of packets, wherein the control signaling that indicates the measurement is obtained based at least in part on outputting the control signaling.

Aspect 26: The method of any of aspects 20 through 25, wherein outputting the control signaling comprises: outputting the control signaling indicating a measurement threshold to be applied to each data radio bearer of a set of data radio bearers.

Aspect 27: The method of any of aspects 20 through 26, wherein obtaining the control signaling comprises: obtaining information that indicates whether the measurement exceeds an uplink packet delay threshold.

Aspect 28: The method of aspect 27, wherein obtaining the information comprises: obtaining an indication that indicates whether the measurement exceeds the uplink packet delay threshold on a resource of a physical uplink control channel.

Aspect 29: The method of aspect 28, wherein the indication is a bit carried on the resource of the physical uplink control channel or the indication is a cyclic shift of the resource of the physical uplink control channel.

Aspect 30: The method of any of aspects 27 through 29, wherein the information indicates that the measurement exceeds the uplink packet delay threshold.

Aspect 31: The method of any of aspects 27 through 30, wherein obtaining the information comprises: obtaining an indication of whether the measurement exceeds the uplink packet delay threshold on a control resource of a physical uplink shared channel.

Aspect 32: The method of any of aspects 27 through 31, wherein obtaining the information comprises: obtaining an indication that a ratio of uplink packets have measurements that exceed the uplink packet delay threshold.

Aspect 33: The method of any of aspects 27 through 32, wherein outputting the control signaling comprises: outputting control information that indicates a resource that the UE is to use for transmitting the information that indicates whether the measurement exceeds the uplink packet delay threshold.

Aspect 34: The method of aspect 33, wherein the control information is output using a radio resource control message.

Aspect 35: The method of any of aspects 20 through 34, wherein obtaining the control signaling that indicates the measurement comprises: obtaining the measurement of the uplink packet delay for each packet of a plurality of packets.

Aspect 36: The method of any of aspects 20 through 35, wherein obtaining the control signaling that indicates the measurement comprises: obtaining the measurement that corresponds to the duration between the packet arrival time and the retransmission that is subsequent to a first retransmission of the packet.

Aspect 37: The method of any of aspects 20 through 36, wherein obtaining the control signaling comprises: obtaining a medium access control layer control element message that indicates the measurement.

Aspect 38: The method of any of aspects 20 through 37, further comprising: outputting, based at least on obtaining the control signaling, an indication that a cell in which the UE is operating is to switch to an off state during a transmission time interval.

Aspect 39: A method for wireless communications at a UE, comprising: receiving control signaling indicating one or more measurement conditions for uplink packet delay measurements while a cell is operating according to an energy saving mode; generating a measurement of uplink packet delay while the cell is operating according to the energy saving mode; transmitting, based at least in part on the measurement satisfying the one or more measurement conditions, a signal configured to cause the cell to transition from the energy saving mode; and transmitting, based at least in part on transmitting the signal, one or more packets via the cell.

Aspect 40: The method of aspect 39, wherein receiving the control signaling comprises: receiving the control signaling indicating at least one averaging window for measuring an average uplink packet delay while the cell is operating according to the energy saving mode.

Aspect 41: The method of aspect 40, wherein the control signaling indicates a duration and a start time for the at least one averaging window.

Aspect 42: The method of any of aspects 40 through 41, wherein the control signaling indicates a respective averaging window per data radio bearer of a set of data radio bearers.

Aspect 43: The method of any of aspects 40 through 42, wherein the control signaling indicates a start time for the at least one averaging window that is based at least in part on a time when the cell transitions to operating according to the energy saving mode.

Aspect 44: The method of any of aspects 40 through 43, wherein the one or more measurement conditions comprise an average delay threshold; and the measurement satisfies the one or more measurement conditions based at least in part on an average packet delay satisfying the average delay threshold during the at least one averaging window.

Aspect 45: The method of any of aspects 39 through 44, wherein receiving the control signaling comprises: receiving the control signaling indicating a respective measurement threshold per data radio bearer of a set of data radio bearers.

Aspect 46: The method of any of aspects 39 through 45, wherein receiving the control signaling comprises: receiving the control signaling indicating a measurement threshold to be applied to each data radio bearer of a set of data radio bearers.

Aspect 47: The method of any of aspects 39 through 46, wherein transmitting the signal comprises: transmitting an uplink wake up signal or a scheduling request that is configured to cause the cell to transition from the energy saving mode.

Aspect 48: The method of any of aspects 39 through 47, wherein transmitting the signal comprises: transmitting the signal via a resource of a set of periodic resources configured for communications while the cell is operating in the energy saving mode.

Aspect 49: The method of any of aspects 39 through 48, wherein transmitting the signal comprises: transmitting, to a low-power radio associated with the cell, the signal configured to cause the cell to transition from the energy saving mode.

Aspect 50: The method of any of aspects 39 through 49, wherein generating the measurement comprises: generating the measurement based at least in part on a packet arrival time at a packet data convergence protocol layer of the UE.

Aspect 51: The method of any of aspects 39 through 50, further comprising: determining that the one or more measurement conditions are satisfied based at least in part on a ratio of packets in an uplink buffer of the UE exceeding a configured delay threshold.

Aspect 52: The method of any of aspects 39 through 51, further comprising: receiving signaling indicating the cell is to transition to the energy saving mode, wherein the measurement is generated based at least in part on receiving the signaling.

Aspect 53: A method for wireless communications at a network entity, comprising: outputting control signaling indicating one or more measurement conditions for uplink packet delay measurements while a cell is operating according to an energy saving mode; obtaining, based at least in part on outputting the control signaling, a signal that is configured to cause the cell associated with the network entity to transition from the energy saving mode; and obtaining, based at least in part on obtaining the signal; a packet that is transmitted via the cell.

Aspect 54: The method of aspect 53, wherein outputting the control signaling comprises: outputting the control signaling indicating at least one averaging window for measuring an average uplink packet delay while the cell is operating according to the energy saving mode.

Aspect 55: The method of aspect 54, wherein the control signaling indicates a duration and a start time for the at least one averaging window.

Aspect 56: The method of any of aspects 54 through 55, wherein the control signaling indicates a respective averaging window per data radio bearer of a set of data radio bearers.

Aspect 57: The method of any of aspects 54 through 56, wherein the control signaling indicates a start time for the at least one averaging window that is based at least in part on a time when the cell transitions to operating according to the energy saving mode.

Aspect 58: The method of any of aspects 54 through 57, wherein the one or more measurement conditions comprise an average delay threshold.

Aspect 59: The method of any of aspects 53 through 58, wherein outputting the control signaling comprises: outputting the control signaling indicating a respective measurement threshold per data radio bearer of a set of data radio bearers.

Aspect 60: The method of any of aspects 53 through 59, wherein outputting the control signaling comprises: outputting the control signaling indicating a measurement threshold to be applied to each data radio bearer of a set of data radio bearers.

Aspect 61: The method of any of aspects 53 through 60, wherein obtaining the signal comprises: obtaining an uplink wake up signal or a scheduling request to cause the cell to transition from the energy saving mode.

Aspect 62: The method of any of aspects 53 through 61, wherein obtaining the signal comprises: obtaining the signal via a resource of a set of periodic resources configured for communications while the cell is operating in the energy saving mode.

Aspect 63: The method of any of aspects 53 through 62, wherein obtaining the signal comprises: obtaining the signal from a low-power radio associated with the cell.

Aspect 64: An apparatus for wireless communications at a UE, comprising at least one processor; and at least one memory coupled with the at least one processor, with instructions stored in the at least one memory, the instructions being executable by the at least one processor, individually or in any combination, to cause the apparatus to perform a method of any of aspects 1 through 19.

Aspect 65: An apparatus for wireless communications at a UE, comprising at least one means for performing a method of any of aspects 1 through 19.

Aspect 66: A non-transitory computer-readable medium storing code for wireless communications at a UE, the code comprising instructions executable by a processor to perform a method of any of aspects 1 through 19.

Aspect 67: An apparatus for wireless communication at a network entity, comprising at least one processor; and at least one memory coupled with the at least one processor, with instructions stored in the at least one memory, the instructions being executable by the at least one processor, individually or in any combination, to cause the apparatus to perform a method of any of aspects 20 through 38.

Aspect 68: An apparatus for wireless communication at a network entity, comprising at least one means for performing a method of any of aspects 20 through 38.

Aspect 69: A non-transitory computer-readable medium storing code for wireless communication at a network entity, the code comprising instructions executable by a processor to perform a method of any of aspects 20 through 38.

Aspect 70: An apparatus for wireless communications at a UE, comprising at least one processor; and at least one memory coupled with the at least one processor, with instructions stored in the at least one memory, the instructions being executable by the at least one processor, individually or in any combination, to cause the apparatus to perform a method of any of aspects 39 through 52.

Aspect 71: An apparatus for wireless communications at a UE, comprising at least one means for performing a method of any of aspects 39 through 52.

Aspect 72: A non-transitory computer-readable medium storing code for wireless communications at a UE, the code comprising instructions executable by a processor to perform a method of any of aspects 39 through 52.

Aspect 73: An apparatus for wireless communications at a network entity, comprising at least one processor; and at least one memory coupled with the at least one processor, with instructions stored in the at least one memory, the instructions being executable by the at least one processor, individually or in any combination, to cause the apparatus to perform a method of any of aspects 53 through 63.

Aspect 74: An apparatus for wireless communications at a network entity, comprising at least one means for performing a method of any of aspects 53 through 63.

Aspect 75: A non-transitory computer-readable medium storing code for wireless communications at a network entity, the code comprising instructions executable by a processor to perform a method of any of aspects 53 through 63.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described herein for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described herein in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described herein as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:
at least one processor; and
at least one memory coupled with the at least one processor, with instructions stored in the at least one memory, the instructions being executable by the at least one processor, individually or in any combination, to cause the apparatus to:
receive control signaling that indicates a configuration for measuring an uplink packet delay for transmission of a packet;
generate a measurement of the uplink packet delay for transmission of the packet, wherein the measurement corresponds to a duration between a packet arrival time at a packet data convergence protocol layer of the UE and the end of an uplink transmission time interval (UL TTI) in which a transmission or a retransmission of the packet occurs; and
transmit control signaling that indicates the generated measurement.

2. The apparatus of claim 1, wherein the instructions are further executable by the at least one processor, individually or in any combination, to cause the apparatus to:
receive, after the transmission of the packet, a scheduling grant that schedules a resource for the retransmission of the packet, wherein the duration is between the packet arrival time and the retransmission of the packet based at least in part on receiving the scheduling grant.

3. The apparatus of claim 1, wherein the instructions are further executable by the at least one processor, individually or in any combination, to cause the apparatus to:
monitor, after transmission of the packet and during a set of resources, for a scheduling grant that schedules a resource for the retransmission of the packet; and
determine, based at least in part on the monitoring, an absence of the scheduling grant during the set of resources, wherein the duration is between the packet arrival time and the transmission of the packet based at least in part on determining the absence of the scheduling grant.

4. The apparatus of claim 1, wherein, to generate the measurement, the instructions are executable by the at least one processor, individually or in any combination, to cause the apparatus to:
generate an average of the duration between the packet arrival time and the transmission or the retransmission for each packet for a plurality of packets, wherein the generated measurement is the average of the duration.

5. The apparatus of claim 4, wherein, to receive the control signaling, the instructions are executable by the at least one processor, individually or in any combination, to cause the apparatus to:
receive control information that indicates a quantity of packets of the plurality of packets, wherein the average is generated based at least in part on receiving the control information.

6. The apparatus of claim 1, wherein, to receive the control signaling, the instructions are executable by the at least one processor, individually or in any combination, to cause the apparatus to:
receive control information that indicates a second duration during which the UE is to monitor the uplink packet delay for a plurality of packets, wherein the measurement is generated based at least in part on measuring the uplink packet delay for the plurality of packets during the second duration.

7. The apparatus of claim 1, wherein, to transmit the control signaling, the instructions are executable by the at least one processor, individually or in any combination, to cause the apparatus to:
transmit information that indicates whether the measurement exceeds an uplink packet delay threshold.

8. The apparatus of claim 7, wherein, to transmit the information that indicates whether the measurement exceeds the uplink packet delay threshold, the instructions are executable by the at least one processor, individually or in any combination, to cause the apparatus to:
transmit an indication of whether the measurement exceeds the uplink packet delay threshold on a resource of a physical uplink control channel or on a control resource of a physical uplink shared channel.

9. The apparatus of claim 8, wherein the indication is a bit carried on the resource of the physical uplink control channel or the indication is a cyclic shift of the resource of the physical uplink control channel.

10. The apparatus of claim 7, wherein the instructions are further executable by the at least one processor, individually or in any combination, to cause the apparatus to:
determine that the measurement exceeds the uplink packet delay threshold, wherein the information is transmitted in response to determining that the measurement exceeds the uplink packet delay threshold.

11. The apparatus of claim 7, wherein, to receive the control signaling, the instructions are executable by the at least one processor, individually or in any combination, to cause the apparatus to:
receive control information that indicates a resource that the UE is to use for transmitting the information that indicates whether the measurement exceeds the uplink packet delay threshold.

12. The apparatus of claim 1, wherein, to transmit the control signaling, the instructions are executable by the at least one processor, individually or in any combination, to cause the apparatus to:

transmit the measurement of the uplink packet delay for each packet of a plurality of packets.

13. The apparatus of claim 1, wherein, to generate the measurement, the instructions are executable by the at least one processor, individually or in any combination, to cause the apparatus to:

generate the measurement that corresponds to the duration between the packet arrival time and the retransmission that is subsequent to a first retransmission of the packet.

14. The apparatus of claim 1, wherein the instructions are further executable by the at least one processor, individually or in any combination, to cause the apparatus to:

receive, based at least in part on transmitting the control signaling, an indication that a cell in which the UE is operating is to switch to an off state during a transmission time interval.

15. An apparatus for wireless communication at a network entity, comprising:

at least one processor; and at least one memory coupled with the at least one processor, with instructions stored in the at least one memory, the instructions being executable by the at least one processor, individually or in any combination, to cause the apparatus to:

output control signaling that indicates a configuration that a user equipment (UE) is to use for measuring an uplink packet delay for transmission of packet, wherein the configuration corresponds to a determination of whether the network entity is to transition a cell to an off state;

obtain control signaling that indicates a measurement of the uplink packet delay, wherein the measurement corresponds to a duration between a packet arrival time at a packet data convergence protocol layer of the UE and the end of an uplink transmission time interval (UL TTI) in which a transmission or a retransmission of the packet occurs in accordance with the configuration; and communicate based at least in part on the measurement and the determination.

16. The apparatus of claim 15, wherein the instructions are further executable by the at least one processor, individually or in any combination, to cause the apparatus to:

output a scheduling grant that schedules a resource for retransmission of the packet, wherein the duration is between the packet arrival time and the retransmission of the packet based at least in part on receiving the scheduling grant.

17. The apparatus of claim 15, wherein the instructions are further executable by the at least one processor, individually or in any combination, to cause the apparatus to:

obtain the transmission of the packet, wherein the duration is between the packet arrival time and the transmission of the packet based at least in part on obtaining the transmission of the packet.

18. The apparatus of claim 15, wherein, to obtain the control signaling, the instructions are executable by the at least one processor, individually or in any combination, to cause the apparatus to:

obtain an average of the duration for each packet of a plurality of packets, wherein the measurement is the average of the duration.

19. The apparatus of claim 18, wherein, to output the control signaling, the instructions are executable by the at least one processor, individually or in any combination, to cause the apparatus to:

output control information that indicates a quantity of packets of the plurality of packets, wherein the control signaling that indicates the measurement is obtained based at least in part on outputting the control signaling.

20. The apparatus of claim 15, wherein, to output the control signaling, the instructions are executable by the at least one processor, individually or in any combination, to cause the apparatus to:

output control information that indicates a second duration during which the UE is to monitor the uplink packet delay for a plurality of packets, wherein the control signaling that indicates the measurement is obtained based at least in part on outputting the control signaling.

21. The apparatus of claim 15, wherein, to obtain the control signaling, the instructions are executable by the at least one processor, individually or in any combination, to cause the apparatus to:

obtain information that indicates whether the measurement exceeds an uplink packet delay threshold.

22. The apparatus of claim 21, wherein, to obtain the information, the instructions are executable by the at least one processor, individually or in any combination, to cause the apparatus to:

obtain an indication that indicates whether the measurement exceeds the uplink packet delay threshold on a resource of a physical uplink control channel or on a control resource of a physical uplink shared channel.

23. The apparatus of claim 22, wherein the indication is a bit carried on the resource of the physical uplink control channel or the indication is a cyclic shift of the resource of the physical uplink control channel.

24. The apparatus of claim 15, wherein, to obtain the control signaling that indicates the measurement, the instructions are executable by the at least one processor, individually or in any combination, to cause the apparatus to:

obtain the measurement of the uplink packet delay for each packet of a plurality of packets.

25. The apparatus of claim 15, wherein the instructions are further executable by the at least one processor, individually or in any combination, to cause the apparatus to:

output, based at least on obtaining the control signaling, an indication that a cell in which the UE is operating is to switch to an off state during a transmission time interval.

26. A method for wireless communications at a user equipment (UE), comprising:

receiving control signaling that indicates a configuration for measuring an uplink packet delay for transmission of a packet;

generating a measurement of the uplink packet delay for transmission of the packet, wherein the measurement corresponds to a duration between a packet arrival time at a packet data convergence protocol layer of the UE and the end of an uplink transmission time interval (UL TTI) in which a transmission or a retransmission of the packet occurs; and transmitting control signaling that indicates the generated measurement.

27. The method of claim 26, further comprising:

receiving, after the transmission of the packet, a scheduling grant that schedules a resource for the retransmission of the packet, wherein the duration is between the packet arrival time and the retransmission of the packet based at least in part on receiving the scheduling grant.

28. The method of claim 26, further comprising:

monitoring, after transmission of the packet and during a set of resources, for a scheduling grant that schedules a resource for the retransmission of the packet; and determining, based at least in part on the monitoring, an absence of the scheduling grant during the set of resources, wherein the duration is between the packet arrival time and the transmission of the packet based at least in part on determining the absence of the scheduling grant.

29. A method for wireless communication at a network entity, comprising:

outputting control signaling that indicates a configuration that a user equipment (UE) is to use for measuring an uplink packet delay for transmission of packet, wherein the configuration corresponds to a determination of whether the network entity is to transition a cell to an off state;

obtaining control signaling that indicates a measurement of the uplink packet delay, wherein the measurement corresponds to a duration between a packet arrival time at a packet data convergence protocol layer of the UE and the end of an uplink transmission time interval (UL TTI) in which a transmission or a retransmission of the packet occurs in accordance with the configuration; and communicating based at least in part on the measurement and the determination.

30. The method of claim 29, further comprising:

outputting a scheduling grant that schedules a resource for retransmission of the packet, wherein the duration is between the packet arrival time and the retransmission of the packet based at least in part on receiving the scheduling grant.

* * * * *